United States Patent
Shin et al.

(10) Patent No.: US 11,593,031 B2
(45) Date of Patent: Feb. 28, 2023

(54) OPERATING METHOD OF HOST DEVICE AND STORAGE DEVICE USING CREDIT

(71) Applicant: Samsung Electronics Co., Ltd., Suwon-si (KR)

(72) Inventors: Myungsub Shin, Suwon-si (KR); Sungho Seo, Suwon-si (KR); Seongyong Jang, Seoul (KR); Haesung Jung, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 17/375,328

(22) Filed: Jul. 14, 2021

(65) Prior Publication Data

US 2022/0113909 A1 Apr. 14, 2022

(30) Foreign Application Priority Data

Oct. 12, 2020 (KR) ........................ 10-2020-0131294

(51) Int. Cl.
*G06F 3/06* (2006.01)

(52) U.S. Cl.
CPC .......... *G06F 3/0659* (2013.01); *G06F 3/0604* (2013.01); *G06F 3/0673* (2013.01)

(58) Field of Classification Search
CPC .... G06F 3/0604; G06F 3/0655; G06F 3/0659; G06F 3/0673; G06F 13/37
USPC ........................................................ 711/154
See application file for complete search history.

(56) References Cited

U.S. PATENT DOCUMENTS

| 7,269,700 B2 | 9/2007 | Au et al. |
| 7,679,133 B2 | 3/2010 | Son et al. |
| 8,553,466 B2 | 10/2013 | Han et al. |
| 8,559,235 B2 | 10/2013 | Yoon et al. |

(Continued)

FOREIGN PATENT DOCUMENTS

| KR | 10-2017-0013270 A | 2/2017 |
| KR | 101870062 B1 | 6/2018 |

OTHER PUBLICATIONS

JEDEC, "Universal Flash Storage (UFS)", retrieved Jan. 31, 2020 via the WayBack Machine <http://web.archive.org/web/20200131165053/https://www.jedec.org/standards-documents/focus/flash/universal-flash-storage-ufs> (Year: 2020).*

(Continued)

*Primary Examiner* — Reginald G Bragdon
*Assistant Examiner* — Aaron D Ho
(74) *Attorney, Agent, or Firm* — Harness, Dickey & Pierce, P.L.C.

(57) ABSTRACT

An electronic device may include a host device and a storage device which are connected in a universal flash storage standard, wherein the host device may include processing circuitry configured to process a submission queue (SQ) and a completion queue (CQ), wherein the SQ is a processing standby line of a command, and the CQ is a processing standby line of a response received from the storage device, transmit the command to the storage device, store a host command credit in a host command register, the host command credit indicating an estimated command accommodation limit of the storage device, store the response in a response slot, and store a host response credit in a host command register, the host command credit indicating a limit of the response slot.

20 Claims, 25 Drawing Sheets

(56) References Cited

U.S. PATENT DOCUMENTS

| | | | |
|---|---|---|---|
| 8,654,587 | B2 | 2/2014 | Yoon et al. |
| 9,471,254 | B2 | 10/2016 | Shaharabany et al. |
| 9,519,440 | B2 | 12/2016 | Shacham et al. |
| 9,563,511 | B1* | 2/2017 | Foley .................... G06F 3/0689 |
| 9,760,311 | B1* | 9/2017 | Amir ..................... G06F 3/0653 |
| 2009/0073881 | A1 | 3/2009 | Cui |
| 2011/0233648 | A1 | 9/2011 | Seol et al. |
| 2014/0331001 | A1* | 11/2014 | Liu ....................... G06F 3/0659 |
| | | | 711/103 |
| 2015/0032915 | A1 | 1/2015 | Hur et al. |
| 2015/0134857 | A1* | 5/2015 | Hahn ....................... G06F 3/061 |
| | | | 710/5 |
| 2016/0372160 | A1* | 12/2016 | Lehmann ................. G11C 5/14 |
| 2017/0322897 | A1* | 11/2017 | Benisty .................. G06F 13/37 |
| 2018/0275923 | A1* | 9/2018 | Earhart ............... H04L 41/5019 |
| 2019/0087362 | A1* | 3/2019 | Satish ................. G06F 13/1668 |
| 2020/0097422 | A1* | 3/2020 | Benisty ............... G06F 13/1668 |
| 2021/0119930 | A1* | 4/2021 | Debbage ............... H04L 1/1642 |
| 2022/0027059 | A1* | 1/2022 | Chen ....................... G06F 3/067 |

OTHER PUBLICATIONS

NVM Express, "NVM Express Revision 1.4", Jun. 10, 2019, pp. 1-9 (Year: 2019).*

H. T. Kung, Trevor Blackwell, and Alan Chapman. 1994. Credit-based flow control for ATM networks: credit update protocol, adaptive credit allocation and statistical multiplexing. SIGCOMM Comput. Commun. Rev. 24, 4 (Oct. 1994), 101-114. https://doi.org/10.1145/190809.190324 (Year: 1994).*

Arashloo, M. T., Lavrov, A., Ghobadi, M., Rexford, J., Walker, D., & Wentzlaff, D. (2020). Enabling Programmable Transport Protocols in {High-Speed}{NICs}. In 17th USENIX Symposium on Networked Systems Design and Implementation (NSDI 20) (pp. 93-109). (Year: 2020).*

Min, J., Ahn, S., La, K., Chang, W., & Kim, J. (Dec. 2015). Cgroup++ Enhancing I/O Resource Management of Linux Cgroup on NUMA Systems with NVMe SSDs. In Proceedings of the Posters and Demos Session of the 16th International Middleware Conference (pp. 1-2). (Year: 2015).*

K. Liu et al., "Exploring Token-Oriented In-Network Prioritization in Datacenter Networks," in IEEE Transactions on Parallel and Distributed Systems, vol. 31, No. 5, pp. 1223-1238, May 1, 2020, doi: 10.1109/TPDS.2019.2958899. (Year: 2020).*

\* cited by examiner

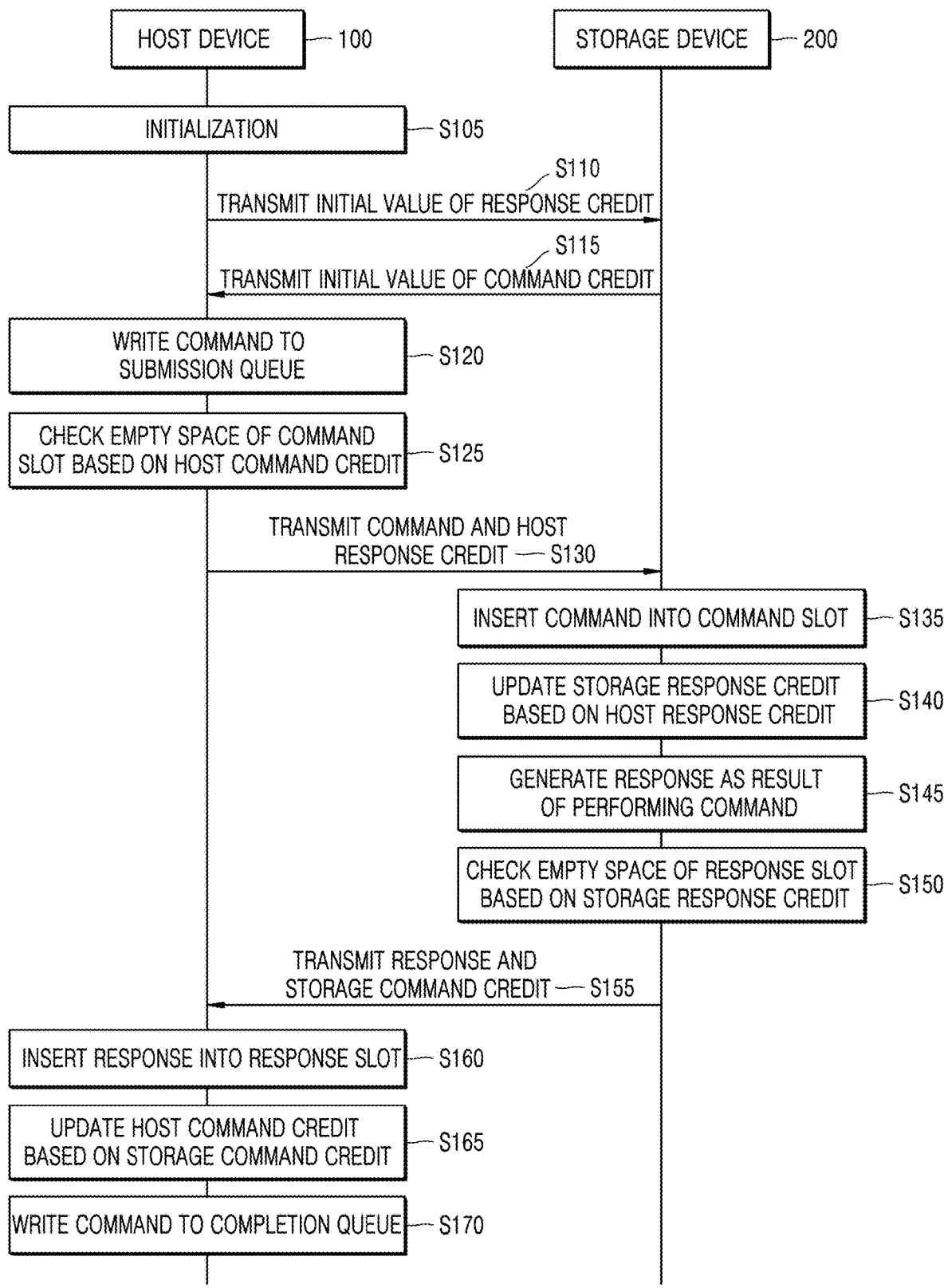

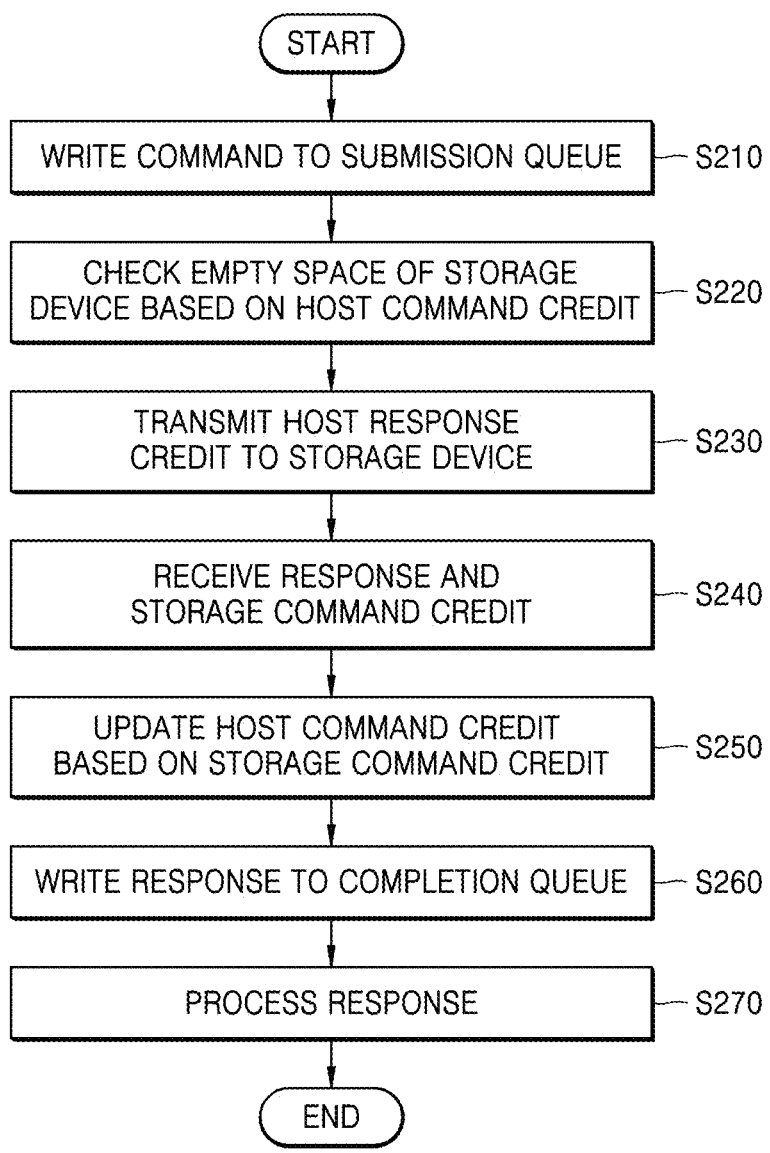

FIG. 10A

| | 0 | 1 | 2 | 3 |
|---|---|---|---|---|
| 0 | xx00 0001b | Flags | LUN | Task Tag |
| 4 | IID \| Commnad Type | SQ_ID | CQ_ID | CR_RESP |
| 8 | Total EHS Length(00h) | Reserved | | (LSB) |
| 12 | (MSB) | | | (LSB) |
| | | Expected Data Transfer Length | Data Segment Length | |
| 16 | CDB[0] | CDB[1] | CDB[2] | CDB[3] |
| 20 | CDB[4] | CDB[5] | CDB[6] | CDB[7] |
| 24 | CDB[8] | CDB[9] | CDB[10] | CDB[11] |
| 28 | CDB[12] | CDB[13] | CDB[14] | CDB[15] |

PACKET_C

FIG. 10B

| PACKET_R | | | | |
|---|---|---|---|---|
| 0 | 1 | 2 | 3 | |
| x00 0001b | Flags | LUM | Task Tag | |
| 4 | 5 | 6 | 7 | |
| IID \| Commnad Type | Reserved | RESPONSE | STATUS | |
| 8 | 9 | 10 | 11 | |
| Total EHS Length(00h) | Device Information | (MSB) Data Segment Length (LSB) | | |
| 12 | 13 | 14 | 15 | |
| Residual Transfer Count | | | | |
| 16 | 17 | 18 | 19 | |
| Reserved | | | | |
| 20 | 21 | 22 | 23 | |
| Reserved | | | | |
| 24 | 25 | 26 | 27 | |
| Reserved | | | | |
| 28 | 29 | 30 | 31 | |
| SQ_ID | CQ_ID | CR_CMD | Reserved | |
| Header E2ECRC (omit if HD=0) | | | | |
| k | k+1 | k+2 | k+3 | |
| (MSB) Sense Data Length | Sense Data[0] | Sense Data[1] | | |
| ... | ... | ... | ... | |
| k+16 | k+17 | k+18 | k+19 | |
| Sense Data[14] | Sense Data[15] | Sense Data[16] | Sense Data[17] | |
| Data E2ECRC (omit if HD=0) | | | | |

NOTE 1 k=32 if HD=0.

OPERATING METHOD OF HOST DEVICE AND STORAGE DEVICE USING CREDIT

CROSS-REFERENCE TO RELATED APPLICATION

This application is based on and claims priority under 35 U.S.C. § 119 to Korean Patent Application No. 10-2020-0131294, filed on Oct. 12, 2020, in the Korean Intellectual Property Office, the disclosure of which is incorporated by reference herein in its entirety.

BACKGROUND

The inventive concepts relate to an electronic device using a credit, and more particularly, to an electronic device using a credit, and an operation method of a host device and a storage device that interface with each other by using a credit.

A non-volatile memory may retain stored data even when power is turned off. Recently, storage devices including flash-based non-volatile memories such as an embedded multi-media card (eMMC), a universal flash storage (UFS), a solid-state drive (SSD), a memory card, or the like, have been widely used, and the storage devices are usefully used to store or move a large amount of data.

A data processing system including a storage device may be referred to as a storage system, and the storage system may include a host device and a storage device. The host device may be connected to the storage device through various interface standards, and data processing performance may be improved by reducing, during interface operations, overheads of data processing operations such as writing and reading, or the like.

SUMMARY

The inventive concepts provide an operating method of a host device and a storage device, in which the host device may interface with the storage device even in a multi-queue environment by using a credit.

According to example embodiments of the inventive concepts, there is provided an electronic device including a host device and a storage device which are connected in a universal flash storage standard, wherein the host device includes: processing circuitry configured to process a submission queue (SQ) and a completion queue (CQ), wherein the SQ is a processing standby line of a command, and the CQ is a processing standby line of a response received from the storage device; transmit the command to the storage device; store a host command credit in a host command register, the host command credit indicating an estimated command accommodation limit of the storage device; store the response in a response slot; and store a host response credit in a host command register, the host command credit indicating a limit of the response slot.

According to example embodiments of the inventive concepts, there is provided an operating method of a host device to which a universal standard is applied, the operating method including: writing a command to at least one submission queue (SQ); transmitting, to a storage device, the command and a host response credit, the hose response credit indicating an actual response accommodation limit of the host device, the response accommodation limit of the host device based on a host command credit, the host command credit indicating an estimated command accommodation limit of the storage device; receiving a response and a storage command credit from the storage device, the response being a result of performing the command, and the storage command credit indicating an actual command accommodation limit of the storage device; updating the host command credit based on the storage command credit; and writing the response to at least one completion queue (CQ).

According to example embodiments of the inventive concepts, there is provided an operating method of a storage device to which a universal flash storage standard is applied, the operating method including: receiving a command and a host response credit indicating an actual response accommodation limit of a host device; updating a storage response credit indicating an estimated response accommodation limit of the host device based on the host response credit; and transmitting, to the host device, the response and a storage command credit indicating an actual command accommodation limit of the storage device.

According to example embodiments of the inventive concepts, there is provided a host device connected to a storage device by a universal flash storage standard, the host device including: processing circuitry including at least one core, the processing circuitry configured to process a submission queue (SQ) and a completion queue (CQ), the SQ being a processing standby line of a command, and the CQ being a processing standby line of a response; store a host command credit in a host command register, the host command credit indicating an estimated command accommodation limit of the storage device; store the response in a response slot; and store a host response credit in a host response register, the host response credit indicating a limit of the response slot.

According to example embodiments of the inventive concepts, there is provided a storage device connected to a host device by a universal flash storage standard, the storage device including: a storage response register configured to store a storage response credit indicating an estimated response accommodation limit of the host device; a command slot configured to store a command; a storage command register configured to store a storage command credit indicating a limit of the command slot; and a storage controller configured to transmit a response to the host device, the response being a result of performing the command.

BRIEF DESCRIPTION OF THE DRAWINGS

Example embodiments of the inventive concepts will be more clearly understood from the following detailed description taken in conjunction with the accompanying drawings in which:

FIG. 6 is a flowchart illustrating an operating method of an electronic device according to example embodiments of the inventive concepts;

FIG. 7 is a flowchart illustrating an operating method of a host device according to example embodiments of the inventive concepts;

FIGS. 10A and 10B are diagrams each illustrating a structure of a packet according to example embodiments of the inventive concepts;

DETAILED DESCRIPTION

Hereinafter, various example embodiments of the inventive concepts will be described with reference to the accompanying drawings.

Figure 1:
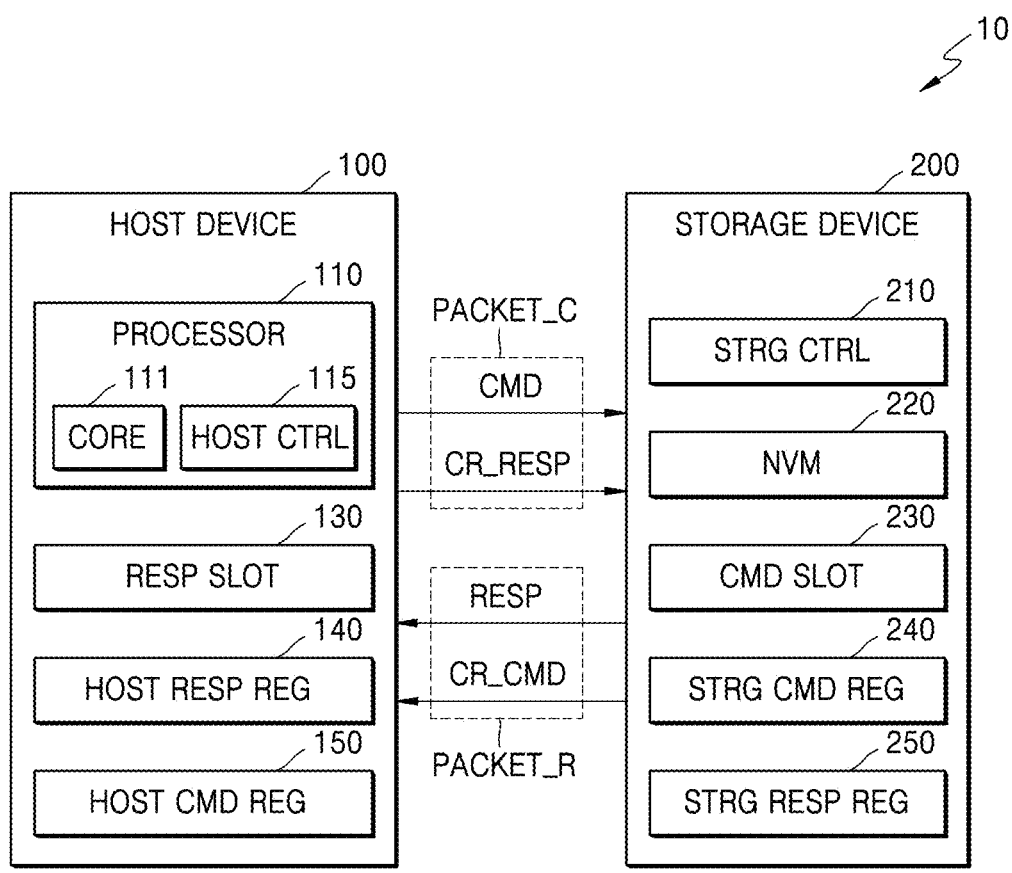
FIG. 1 is a block diagram of an electronic device according to example embodiments of the inventive concepts.

FIG. 1 is a block diagram of an electronic device 10 according to example embodiments of the inventive concepts.

The electronic device 10 may include a host device 100 and a storage device 200. The host device 100 may issue and transmit a command CMD to the storage device 200, and the storage device 200 may read, erase, or write data according to the command CMD, and as a result, may generate and provide a response RESP to the host device 100. In addition, the host device 100 may provide a response credit CR_RESP to the storage device 200, and the storage device 200 may provide a command credit CR_CMD to the host device 100. The command CMD and the response credit CR_RESP may be included in a command packet PACKET_C and managed, and the response RESP and the command credit CR_CMD may be included in a response packet PACKET_R and managed. Components of packets will be described in detail with reference to FIGS. 10A and 10B.

The electronic device 10 may be implemented as, for example, a personal computer (PC), a data server, a network-attached storage (NAS), an Internet of Things (IoT) device, a portable electronic device, etc. The portable electronic device may include a laptop computer, a mobile phone, a smartphone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, an e-book, a wearable device, or the like, but is not limited thereto.

The host device 100 may include a processor 110, a response slot 130, a host response register 140, and/or a host command register 150. In addition, the processor 110 may include a core 111 and a host controller 115.

The host device 100 may provide a user of the host device 100 with various services according to operations of one or more electronic circuits, chips, and/or devices. According to example embodiments, the host device 100 may perform various operations to process a command received from the user of the host device 100 and provide an operation result to the user of the host device 100. The host device 100 according to example embodiments may include an operating system, an application, or the like. The host device 100 according to example embodiments of the inventive concepts may include a universal flash storage (UFS) host control driver configured to support a UFS protocol. However, the inventive concepts are not limited thereto, and the host device 100 may include a driver configured to support an eMMC protocol or a non-volatile memory express (NVMe) protocol.

The processor 110 may control operations (e.g., all operations) of the host device 100, for example, operations of other components included in the host device 100. The processor 110 may be a general-purpose processor, a dedicated processor, an application processor (AP), or the like. In example embodiments, the processor 110 may be an arithmetic processor (e.g., a central processing unit (CPU), a graphics processing unit (GPU), an AP, or the like) including a dedicated logic circuit (e.g., a field programmable gate array (FPGA), application specific integrated circuits (ASICs), or the like), but is not limited thereto.

The processor 110 may include at least one core 111 and may further include the host controller 115 configured to control a memory and/or the storage device 200. According to example embodiments, the processor 110 may further include an accelerator, which is a dedicated circuit for a high-speed data operation, such as an artificial intelligence (AI) data operation or the like. The accelerator may include a GPU, a neural processing unit (NPU), and/or a data processing unit (DPU) and be a chip that is physically separated from the other components of the processor 110.

The core 111 may execute a queue, which is a processing standby line of the command CMD and the response RESP to be processed by the host device 100.

The host controller 115 may generate the command CMD according to a user's request and determine whether to transmit the command CMD to the storage device 200. In addition, the host controller 115 may update the command credit CR_CMD stored in the host device 100 based on the command credit CR_CMD received from the storage device 200. Also, the host controller 115 may receive the response RESP. In example embodiments, the host controller 115 may write the command CMD and/or the response RESP to a queue, or may remove the command CMD and/or the response RESP from the queue.

The response slot 130 may store the response RESP provided from the storage device 200. According to example embodiments, the response slot 130 may temporarily store the response RESP before the response RESP is processed by the processor 110. Hereinafter, a limit in which the response slot 130 may accommodate the response RESP may be referred to as the response credit CR_RESP or a host response credit.

The host response register 140 may be a memory space in which the response credit CR_RESP (or the host response credit) is stored. According to example embodiments, the host response register 140 may store the response credit CR_RESP (or the host response credit), which is the limit in which the response slot 130 may accommodate the response RESP. For example, the response credit CR_RESP may correspond to the number of empty spaces of the response slot 130. The response credit CR_RESP provided to the storage device 200 may be used by the storage device 200 to determine whether to transmit the response RESP to the host device 100.

The host response register 140 is illustrated as an independent storage space in FIG. 1, but the inventive concepts are not limited thereto. According to example embodiments, the host device 100 may store and manage the response credit CR_RESP by using a virtual register (or a virtual storage space). In example embodiments, the response credit CR_RESP (or the host response credit) may be indirectly extracted by confirming the accommodation limit of the response slot 130 or searching for an empty space in the response slot 130.

The host command register 150 may be a memory space in which the command credit CR_CMD is stored. According to example embodiments, the host command register 150 may store the command credit CR_CMD, which is a command accommodation limit of the storage device 200.

Because the command credit CR_CMD is information originally stored in the storage device 200, the command credit CR_CMD stored in the host device 100 and the command credit CR_CMD stored in the storage device 200 may be different from each other. In some example embodiments, the command credit CR_CMD stored in the host device 100 may be an estimated value. The command credit CR_CMD stored in the host device 100 may be referred to as a host command credit, and the command credit CR_CMD stored in the storage device 200 may be referred to as a storage command credit. According to example embodiments of the inventive concepts, after a memory operation of the storage device 200, the host device 100 may update the command credit CR_CMD stored in the host command register 150 (that is, the host command credit) by receiving the response RESP together with the command credit CR_CMD (that is, the storage command credit).

According to example embodiments of the inventive concepts, the storage command credit is updated as the memory operation of the storage device 200 is performed, but the host command credit of the host device 100, which has not yet received the command credit CR_CMD from the storage device 200, may be different from the storage command credit. That is, the host command credit may be an estimated value. According to example embodiments, as the storage device 200 transmits the response RESP together with the command credit CR_CMD to the host device 100, the host command credit may be updated based on the storage command credit.

In example embodiments, when the storage command credit has been transmitted from the storage device 200 to the host device 100 for a long time or when a certain time has elapsed from the time when the storage command credit is transmitted, the host command credit stored in the host device 100 may be different from an actual command credit CR_CMD of the storage device 200.

According to example embodiments of the inventive concepts, when a certain time has elapsed from the time when the response RESP together with the command credit CR_CMD are received or when the host device 100 requests the storage device 200 for a latest command credit CR_CMD, the host device 100 may receive the latest command credit CR_CMD from the storage device 200.

In example embodiments, the host device 100 may determine whether to transmit the command CMD to the storage device 200 based on the host command credit. The host device 100 may determine an actual command accommodation limit of the storage device 200 by using the updated host command credit.

The storage device 200 may include a storage controller 210, a non-volatile memory (NVM) 220, a command slot 230, a storage command register 240, and/or a storage response register 250.

The storage device 200 may correspond to a flash memory device including one or more flash memory chips. In some example embodiments, the storage device 200 may be an embedded memory in the electronic device 10. For example, the storage device 200 may be an eMMC or an embedded UFS memory device. In some example embodiments, the storage device 200 may be an external memory detachably attached to the electronic device 10. For example, the storage device 200 may be a UFS memory card, a compact flash (CF) card, a micro secure digital (micro-SD) card, a mini secure digital (mini-SD) card, an extreme digital (xD) card, a memory stick, etc.

When the storage device 200 includes a flash memory, the flash memory may include a two-dimensional (2D) NAND memory array or a three-dimensional (3D) (or vertical) NAND (VNAND) memory array. The 3D NAND memory array may be monolithically formed in arrays of memory cells having an active area on a silicon substrate, or in at least one physical level of a circuit formed on the silicon substrate or in the silicon substrate as a circuit related to an operation of the memory cells. The term "monolithically" means that a layer of a level of the array is stacked directly on another layer of a lower level of the array.

In example embodiments according to the inventive concepts, the 3D NAND memory array may include vertical NAND strings arranged in a vertical direction such that at least one memory cell is on another memory cell. The at least one memory cell may include a charge trap layer.

The disclosures U.S. Pat. Nos. 7,679,133; 8,553,466; 8,654,587; 8,559,235; and US Pat. Pub. No. 2011/0233648 disclose suitable components for the 3D NAND memory array, wherein the 3D NAND memory array is formed by a plurality of levels, and word lines and/or bit lines are shared between the plurality of levels.

As another example, the storage device 200 may also include various other types of NVMs. For example, the storage device 200 may include magnetic random access memory (RAM) (MRAM), spin-transfer torque MRAM, conductive bridging RAM (CBRAM), ferroelectric RAM (FRAM), phase RAM (PRAM), resistive RAM, and various other kinds of memories.

The storage controller 210 may control operations (e.g., all operations) of the storage device 200. For example, the storage controller 210 may schedule operations of the NVM 220, or may encode signals/data to be processed by the storage device 200. In example embodiments, the storage controller 210 may control the NVM 220 so that the NVM 220 writes, reads, or erases data. In example embodiments, the storage controller 210 may process the command CMD and update the response credit CR_RESP stored in the storage device 200 based on the response credit CR_RESP received from the host device 100.

The NVM 220 may include storage media for storing data according to a request from the host device 100. In example embodiments, the NVM 220 may include at least one flash memory chip that non-volatilely stores data, and as described above, may include a NAND memory array or a VNAND memory array.

The command slot 230 may store the command CMD received from the host device 100. According to example embodiments, the command slot 230 may temporarily store the command CMD before the command CMD is processed. Hereinafter, a limit in which the command slot 230 may accommodate the command CMD may be referred to as the command credit CR_CMD or a storage command credit.

The storage command register 240 may be a memory space in which the command credit CR_CMD (or the storage command credit) is stored. According to example embodiments, the storage command register 240 may store the command credit CR_CMD (or the storage command credit), which is a limit in which the command slot 230 may store the command CMD. For example, the command credit CR_CMD may correspond to the number of empty spaces of the command slot 230. The command credit CR_CMD provided to the host device 100 may be used for the host device 100 to determine whether to transmit the command CMD to the storage device 200.

The storage command register 240 is illustrated as an independent storage space in FIG. 1, but the inventive concept is not limited thereto. According to example embodiments, the storage device 200 may store and manage the command credit CR_CMD (or the storage command credit) by using a virtual register (or a virtual space), and the command credit CR_CMD may be indirectly extracted by confirming an accommodation limit of the command slot 230 or searching for an empty space in the command slot 230.

The storage response register 250 may be a memory space in which the response credit CR_RESP is stored. According to example embodiments, the storage response register 250 may store the response credit CR_RESP, which is a response accommodation limit of the host device 100.

Because the response credit CR_RESP is information originally stored in the host device 100, the response credit CR_RESP stored in the storage device 200 and the response credit CR_RESP stored in the host device 100 may be different from each other. The response credit CR_RESP stored in the storage device 200 may be referred to as a storage response credit, and the response credit CR_RESP stored in the host device 100 may be referred to as a host response credit. At this time, the response credit CR_RESP stored in the storage device 200 may be an estimated value. According to example embodiments of the inventive concepts, after an initialization operation of the host device 100, the storage device 200 may update the response credit CR_RESP (that is, the storage response credit) stored in the storage response register 250 by receiving the command CMD together with the response credit CR_RESP (that is, the host response credit).

According to example embodiments of the inventive concepts, the host response credit is updated as the initialization operation of the host device 100 is performed, but the storage response credit of the storage device 200, which has not yet received the response credit CR_RESP from the host device 100, may be different from the host response credit. That is, the storage response credit may be an estimated value. According to example embodiments, as the host device 100 transmits the command CMD together with the response credit CR_RESP, the storage response credit may be updated based on the host response credit.

In example embodiments, when the host response credit has been transmitted from the host device 100 to the storage device 200 for a long time or when a certain time has elapsed from the time when the host response credit is transmitted, the storage response credit stored in the storage device 200 may be different from an actual response credit CR_RESP of the host device 100.

According to example embodiments of the inventive concepts, when a certain time has elapsed from the time when the command CMD together with the response credit CR_RESP are received or when the storage device 200 requests the host device 100 for a latest response credit CR_RESP, the storage device 200 may receive the latest response credit CR_RESP from the host device 100.

In example embodiments, the storage device 200 may determine whether to transmit the response RESP to the host device 100 based on the storage response credit. The storage device 200 may determine an actual response accommodation limit of the host device 100 by using the updated storage response credit.

The host device 100 and the storage device 200 may communicate with each other through various types of interfaces. According to example embodiments, the host device 100 may be connected to the storage device 200 through various standard interfaces such as UFS, serial ATA (SATA), small computer small interface (SCSI), serial attached SCSI (SAS), eMMC, or the like. The host device 100 and the storage device 200 may each generate and transmit a packet according to a protocol of an interface used thereby. In FIG. 1, the command packet PACKET_C generated by the host device 100 and transmitted to the storage device 200 and the response packet PACKET_R generated by the storage device 200 and transmitted to the host device 100 are illustrated.

The host controller 115 may include a host controller interface (not shown), and the host controller interface may manage an operation of storing data (e.g., write data) on a host memory in the core 111 or storing data (e.g., read data) of the core 111 in the host memory. In addition, the storage controller 210 may include a device controller interface (not shown) for an interface with the host controller 115.

According to example embodiments, the host controller 115 and the host memory may be separate semiconductor chips. Alternatively, in some example embodiments, the host controller 115 and the host memory may be integrated on the same semiconductor chip. For example, the host controller 115 may be any one of a plurality of modules included in an AP, and the AP may be a system-on-a-chip (SoC). In addition, the host memory may be an embedded memory included in the AP, or may be a memory device or a memory module arranged outside the AP.

The host device 100 may further include various devices related to driving of the storage device 200. For example, the host device 100 may further include a software module (not shown) such as a host application, a device driver, or the like, and the software module may be executed by the processor 110 by being loaded into the host memory.

Figure 2:
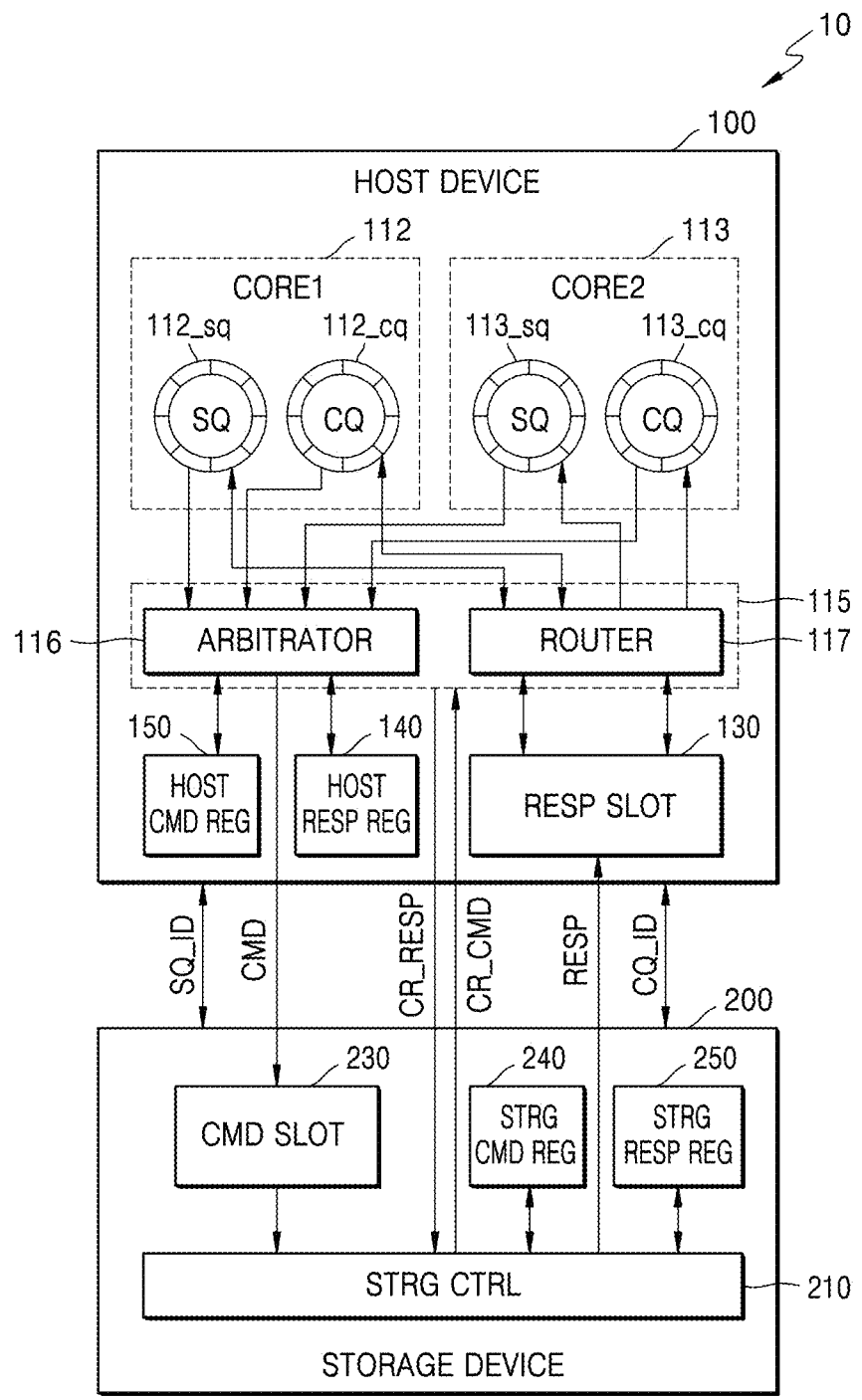
FIG. 2 is a diagram illustrating an implementation example of the electronic device shown in FIG. 1.

FIG. 2 is a diagram illustrating an implementation example of the electronic device 10 shown in FIG. 1. Descriptions will be made with reference to FIGS. 1 and 2 together.

Referring to FIG. 2, the electronic device 10 may include the host device 100 and the storage device 200. A UFS standard is applied for interfacing between the host device 100 and the storage device 200. The host device 100 may include a first core 112, a second core 113, the host controller 115, the response slot 130, the host response register 140, and the host command register 150. In addition, the storage device 200 may include the storage controller 210, the command slot 230, the storage command register 240, and the storage response register 250. In example embodiments, the host device 100 may transmit and receive a submission queue (SQ) ID SQ_ID and a completion queue (CQ) ID CQ_ID to and from the storage device 200.

The core 111 of FIG. 1 may be applied to the first core 112 and the second core 113 of FIG. 2, the host controller 115 of FIG. 1 may be applied to the host controller 115 of FIG. 2, the response slot 130, the host response register 140, and the host command register 150 of FIG. 1 may be respectively applied to the response slot 130, the host response register 140, and the host command register 150 of FIG. 2, and the storage device 200 of FIG. 1 may be applied to the storage device 200 of FIG. 2, and thus, redundant descriptions thereof are omitted.

The first core 112 may manage a first SQ 112_sq and a first CQ 112_cq. In addition, the second core 113 may manage a second SQ 113_sq and a second CQ 113_cq.

An SQ may refer to a line in which various types of events including a request of the host device 100 and the command CMD are on standby to be processed. The command CMD stored in the SQ may be transmitted to the storage device 200 by being fetched by the host controller 115. A CQ may refer to a line for processing various types of events including a request of the storage device 200 and the response RESP. The response RESP stored in the CQ may instruct updating of metadata to be processed by the host device 100 after a memory operation (e.g., writing, reading, or erasing of data) by being fetched by the host controller 115. The SQ and the CQ may be generated in a host memory space of the host device 100. Herein, for convenience of explanation, the SQ and the CQ may be implemented as circular queues, but are not limited thereto.

According to example embodiments, the host device 100 may write the command CMD to the first SQ 112_sq or the second SQ 113_sq. The command CMD stored in the first SQ 112_sq or the second SQ 113_sq may be transmitted to the storage device 200 sequentially or at once by being fetched by the host controller 115. For example, the host controller 115 may select any one of the first SQ 112_sq and the second SQ 113_sq. The selected SQ may be fetched and the command CMD stored in the selected SQ may be transmitted to the storage device 200. The host controller 115 may use various selection methods by changing an internal registry setting.

According to example embodiments, the response RESP may be stored in a CQ selected from the first CQ 112_cq or the second CQ 113_cq, and the stored response RESP may be processed sequentially or at once.

The host controller 115 may provide the command CMD to the command slot 230, and may provide the response credit CR_RESP to the storage controller 210. In addition, the host controller 115 may receive the response RESP to be inserted into the response slot 130 by the storage controller 210, and may receive the command credit CR_CMD from the storage controller 210. In addition, the host controller 115 may provide, to the storage controller 210, the SQ ID SQ_ID indicating an SQ to which the command CMD to be transmitted is written to and the CQ ID CQ_ID indicating a CQ to which the command CMD to be transmitted is related. Similarly, the host controller 115 may receive, from the storage controller 210, the SQ ID SQ_ID indicating an SQ to which the response RESP to be received is related and the CQ ID CQ_ID indicating a CQ to which the response RESP to be transmitted is related.

According to example embodiments of the inventive concepts, the host controller 115 may receive the command credit CR_CMD corresponding to the storage command credit, which is the actual command accommodation limit of the command slot 230 of the storage device 200. The host controller 115 may update the host command register 150 based on the command credit CR_CMD. In example embodiments, as the host command register 150 is updated, the host command credit corresponding to an estimated command accommodation limit of the command slot 230 may be updated as or replaced with the storage command credit, which is the actual command accommodation limit of the command slot 230.

In example embodiments, when the storage command credit has been transmitted from the storage device 200 to the host device 100 for a long time or when a certain time has elapsed from the time when the storage command credit is transmitted, the host command credit stored in the host command register 150 may be different from the actual command credit CR_CMD of the storage device 200.

According to example embodiments of the inventive concepts, when a certain time has elapsed from the time when the response RESP together with the command credit CR_CMD are received or when the host controller 115 requests the storage device 200 for a latest command credit CR_CMD, the host controller 115 may receive the latest command credit CR_CMD from the storage device 200. Accordingly, a gap between the host command credit stored in the host device 100 and the actual command credit CR_CMD may be solved. According to example embodiments of the inventive concepts, the host controller 115 may provide, to the storage controller 210, the response credit CR_RESP corresponding to the host response credit, which is the actual response accommodation limit of the response slot 130. In example embodiments, the host controller 115 may access the host response register 140, load the response credit CR_RESP corresponding to the host response credit stored in the host response register 140, and transmit the response credit CR_RESP to the storage controller 210. The storage controller 210 may update the storage response credit based on the response credit CR_RESP.

The host controller 115 may include an arbitrator 116 and a router 117.

The arbitrator 116 according to example embodiments of the inventive concepts may select any one of the first SQ 112_sq and the second SQ 113_sq to be executed by the first core 112 or the second core 113, and may transmit the command CMD written to the selected SQ to the storage device 200 by fetching the selected SQ. A method, performed by the arbitrator 116, of selecting any one of the first SQ 112_sq and the second SQ 113_sq may include a round robin method, a weighted round robin method, a fixed priority method, or the like, but is not limited thereto.

According to example embodiments, the arbitrator 116 may transmit the command CMD written to the fetched SQ to the command slot 230 of the storage device 200. According to example embodiments of the inventive concepts, the arbitrator 116 may check whether an accommodation limit of the command slot 230 is sufficient based on the host command credit stored in the host command register 150.

In example embodiments, when there is an empty space in the command slot 230, the arbitrator 116 may transmit the command CMD written to the fetched SQ to the command slot 230, and the command CMD may be inserted into the command slot 230. For example, when the host command credit is greater than the number of commands in a currently fetched SQ, the arbitrator 116 may provide the command CMD to the command slot 230. For example, when the host command credit is less than the number of commands in the currently fetched SQ as a result of checking the host command credit, the arbitrator 116 may be on standby until the command slot 230 is cleared so that the accommodation limit thereof become sufficient. The storage controller 210 may generate the response RESP by executing the command CMD inserted into the command slot 230 and performing a memory operation (e.g., writing, reading, or erasing of data) corresponding to the command CMD.

The router 117 according to example embodiments of the inventive concepts may control the response RESP such that the storage controller 210, which overall controls the storage device 200, does not need to check whether each of the first and second CQs 112_cq and 113_cq is full. The router 117 according to example embodiments of the inventive concepts may select any one of the first CQ 112_cq and the second CQ 113_cq to write the response RESP provided from the storage device 200, and may write the response RESP to the selected CQ. Similar to the above-stated method of selecting an SQ, various selection algorithms may be applied to a method, performed by the router 117, of selecting a CQ. According to example embodiments, the router 117 may select a CQ to which the response RESP is to be written by receiving the response RESP inserted into the response slot 130. In example embodiments, the router 117 may determine a CQ, which is loaded to one of a plurality cores, to which the response RESP is to be written by referring to the CQ ID CQ_ID provided by the storage device 200. For example, the router 117 may write the response RESP to the second CQ 113_cq by receiving the CQ_ID CQ_ID indicating the second CQ 113_cq loaded in the second core 113.

In addition, according to example embodiments of the inventive concepts, the router 117 may control input/output of data between the first or second CQ 112_cq or 113_cq and the response slot 130 so that the first or second CQ 112_cq or 113_cq does not overflow. For example, the router 117 may control a data flow between the first or second CQ 112_cq or 113_cq and the response slot 130 to reduce or prevent overflow, which is a state in which the first or second CQ 112_cq or 113_cq is full and may not store the response RESP.

The response slot 130 may temporarily store the response RESP. In example embodiments, the response slot 130 may have a limited storage space to receive the response RESP in an amount that the host device 100 may process. When all the responses RESP generated by the storage device 200 are received, a large throughput may be required for data input/output (or storage) processing among many tasks to be processed by the host device 100, which may incur resource overhead.

The response slot 130 according to example embodiments of the inventive concepts may function as a buffer such that the storage device 200, which overall controls the storage device 200, does not need to check whether each of the first and second CQs 112_cq and 113_cq is full. According to example embodiments of the inventive concepts, the response slot 130 may control data input/output between the host device 100 and the storage device 200 based on the response credit CR_RESP by functioning as a buffer which temporarily stores the response RESP. Accordingly, even when a queue depth of the first and second SQs 112_sq and 113_sq is greater than that of the first and second CQs 112_cq and 113_cq, the storage device 200 does not need to directly check whether the first and second CQs 112_cq and 113_cq are full.

The response slot 130 may reduce overhead or an increase in cost according to data communication between the host device 100 and the storage device 200 by caching the response RESP.

The storage controller 210 may provide the response RESP to the response slot 130 and provide the command credit CR_CMD to the host controller 115. In addition, the storage controller 210 may receive the command CMD inserted into the command slot 230 and receive the response credit CR_RESP from the host controller 115. In addition, other than the command CMD and the response RESP, the storage controller 210 may transmit and receive the SQ_ID SQ_ID and the CQ ID CQ_ID to and from the host controller 115.

According to example embodiments of the inventive concepts, the storage controller 210 may receive the response credit CR_RESP corresponding to the actual response accommodation limit of the response slot 130. The storage controller 210 may update the storage response register 250 based on the response credit CR_RESP. In example embodiments, as the storage response register 250 is updated, the storage response credit corresponding to an estimated response accommodation limit of the response slot 130 may be updated as or replaced with the host response credit, which is the actual response accommodation limit of the response slot 130.

According to example embodiments of the inventive concepts, the storage controller 210 may provide, to the host controller 115, the command credit CR_CMD corresponding to the storage command credit, which is the actual command accommodation limit of the command slot 230. In example embodiments, the storage controller 210 may access the storage command register 240, load the command credit CR_CMD corresponding to the storage command credit stored in the storage command register 240, and transmit the command credit CR_CMD to the host controller 115. The host controller 115 may update the host command credit based on the command credit CR_CMD.

In example embodiments, when the host response credit has been transmitted from the host device 100 to the storage device 200 for a long time or when a certain time has elapsed from the time when the host response credit is transmitted, the storage response credit stored in the storage response register 250 may be different from the actual response credit CR_RESP of the host device 100.

In example embodiments of the inventive concepts, when a certain time has elapsed from the time when the command CMD together with the response credit CR_RESP are received or when the storage controller 210 requests the host device 100 for a latest response credit CR_RESP, the storage controller 210 may receive the latest response credit CR_RESP from the host device 100. Accordingly, a gap between the storage response credit stored in the storage device 200 and the actual response credit CR_RESP may be solved.

The command slot 230 may temporarily store the command CMD. In example embodiments, the command slot 230 may have a limited storage space to receive the command CMD in an amount that the storage device 200 may process. For example, in contrast to that the size of an SQ or a CQ may be 64 K (64,000), a queue depth indicating the command accommodation limit of the command slot 230 may be 32. That is, 32 commands CMD may be cached in the command slot 230.

When commands CMD generated by the host device 100 (e.g., all commands CMD) are transmitted to the storage device 200, a large throughput may be required for data input/output (or storage) processing in the storage device 200, which may incur overhead. The command slot 230 may reduce overhead or an increase in cost according to the data communication between the host device 100 and the storage device 200 by caching the command CMD.

The electronic device 10 according to the inventive concepts may include the arbitrator 116 and the router 117 to reduce or prevent resource occupancy of multiple queues, so that, even in a multi-queue environment, interfacing between the host device 100 and the storage device 200, which adopt the UFS standard, may be smoothly performed. In addition, according to the electronic device 10 according to the inventive concepts, overhead caused by multiple cores occupying resources may be reduced and data processing performance may be improved. In addition, the electronic device 10 according to the inventive concepts may control transmission and reception of the command CMD and the response RESP based on the response credit CR_RESP and the command credit CR_CMD without using a doorbell structure for interfacing in a multi-queue environment.

Figure 3:
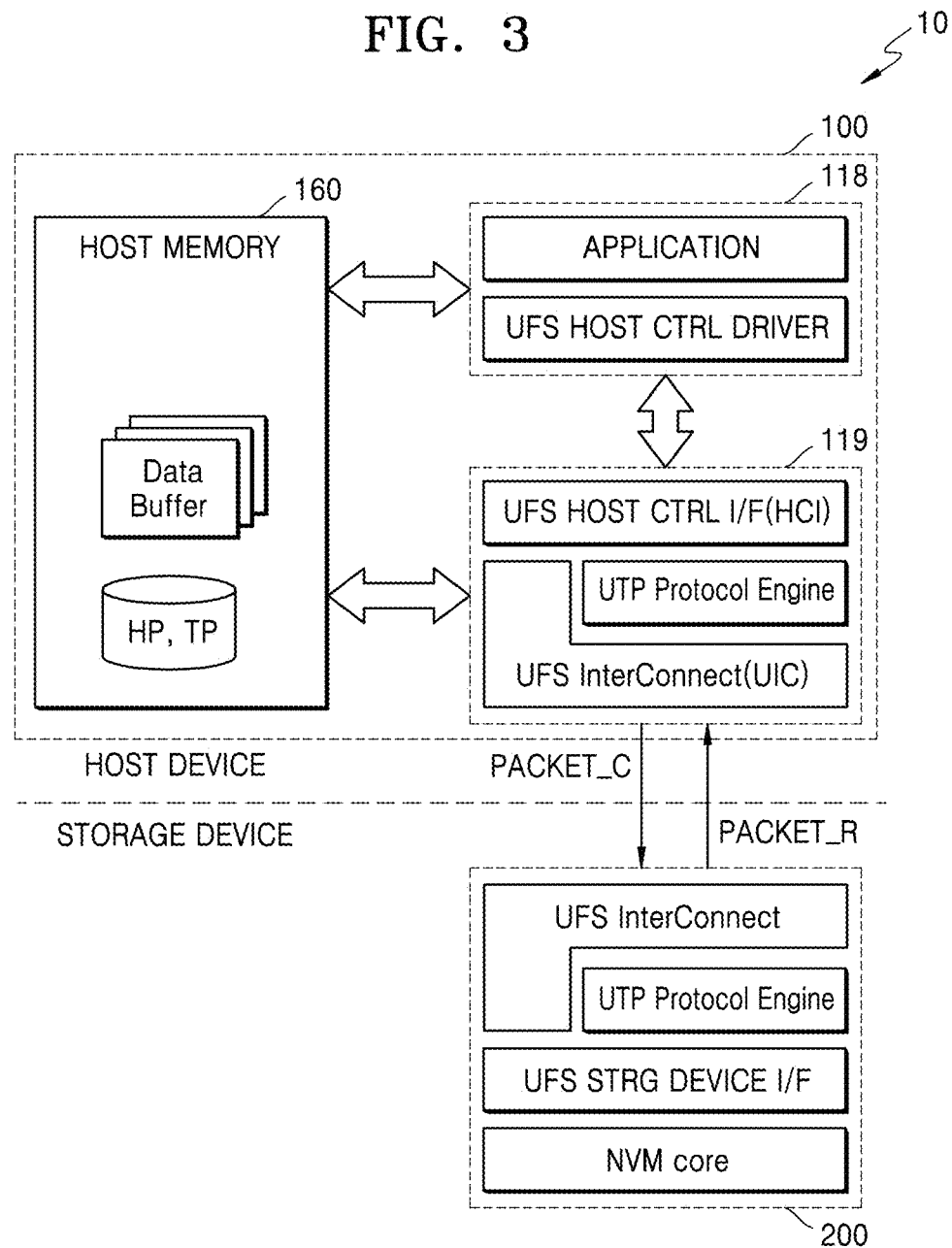
FIG. 3 is a block diagram illustrating an implementation example of an electronic device to which a universal flash storage (UFS) interface is applied.

FIG. 3 is a block diagram illustrating an implementation example of the electronic device 10 to which a UFS interface is applied.

Referring to FIG. 3, the host device 100 and the storage device 200 of the electronic device 10 may perform communication according to the UFS interface, and the host device 100 may include, as components thereof, a software module 118, a host controller 119 corresponding to a hardware module, and a host memory 160. In FIG. 3, the host device 100 interfaced by adopting the UFS standard is referred to as a UFS host.

The software module 118 may include application software and a UFS host controller driver. The application software may be various application programs to be executed by the UFS host. The UFS host controller driver is configured to manage driving of peripheral devices connected to the UFS host and used, and a data management operation such as writing and reading of data with respect to the storage device 200 may be performed by executing the UFS host controller driver. The application software and the UFS host controller driver may be loaded into the host memory 160 or may be loaded into another operating memory in the UFS host and executed by a processor.

The host controller 119 may be an implementation example of the host controller 115 of FIG. 2. The host controller 119 may include a UFS host controller interface (UFS HCI), a UFS Transport Layer (UTP) protocol engine, and/or a UIC (UFS interconnect layer). The UFS HCI may receive a request generated through the UFS host controller driver and deliver the request to the UTP protocol engine, or may provide a data access result delivered from the UTP protocol engine to the UFS host controller driver. The UTP protocol engine may provide services for an upper layer (or an application layer), and as an example, may generate a packet or release a packet to parse information therein.

In addition, the UIC may communicate with the storage device 200, and as an example, the UIC may include a link layer and a physical (PHY) layer. The link layer may be mobile industry processor interface (MIPI) UniPro, and the PHY layer may be MIPI M-PHY.

The storage device 200 may include a storage controller and/or a memory core. According to example embodiments, the storage controller may include a UIC, a UTP protocol engine, and a UFS storage device interface. In addition, the memory core may be an NVM core including a non-volatile memory.

In a structure in which the host controller 119 and the storage device 200 communicate with each other, data transmission and reception according to a request from the UFS host controller driver may be performed through the UFS host controller interface. For example, during a data write operation, write data may be stored in a data buffer of the host memory 160 by the software module 118, the UFS HCI accesses the data buffer of the host memory 160, and the accessed write data may be provided to the storage device 200 interfaced by adopting the UFS interface. The command CMD for the data transmission/reception operation may be stored in a queue. In example embodiments, when a circular queue is used, a head pointer (HP) in which the command CMD is stored and a tail pointer (TP) may be stored in the host memory 160.

Referring to FIGS. 1 and 3 together, according to example embodiments of the inventive concepts, the command packet PACKET_C transmitted from the host device 100 to the storage device 200 and/or the response packet PACKET_R transmitted from the storage device 200 to the host device 100 may include a buffer address indicating a position of the data buffer in the host memory 160. The buffer address may correspond to a physical address indicating the position of the data buffer. In example embodiments, table information (e.g., a physical region description table (PRDT)) including buffer addresses may be stored in one area of the host memory 160, and the UTP protocol engine of the UFS host may check a buffer address through the PRDT and generate the command packet PACKET_C including the checked buffer address. In addition, the UTP protocol engine of the storage device 200 may generate the response packet PACKET_R including a buffer address stored and managed in the storage device 200.

In addition, the host controller 119 and the storage device 200 may be connected in a port-mapped input/output (I/O) form, and write and read operations may be processed in a multi-task method. Accordingly, the storage device 200 may store and manage the command CMD parsed from a plurality of packets and buffer addresses corresponding to the command CMD.

As the UFS interface is applied, various types of packets may be defined, and example embodiments of the inventive concepts may be applied to at least some of the various types of packets. For example, a packet according to the UFS interface may be defined as a UFS protocol information unit (UPIU), and as a type thereof, packets, such as a command UPIU for write and read requests, a response UPIU, a Data_In UPIU including read data, a Data-Out UPIU including write data, a task management (TM) request UPIU, and a ready-to-transfer (RTT) UPIU, may be defined. In addition, according to example embodiments of the inventive concepts, the above-stated buffer address may be included in at least some types of packets among packets defined in the UFS interface, and as an example, the above-stated buffer address may be included in a packet requesting access to the data buffer of the host memory 160. According to the inventive concepts, among packets to be exchanged between the host device 100 and the storage device 200, the command packet PACKET_C may include the command CMD, the response credit CR_RESP, the SQ ID SQ_ID, and the CQ ID CQ_ID, and the response packet PACKET_R may include the response RESP, the command credit CR_CMD, the SQ ID SQ_ID, and the CD ID CQ_ID. Components of each packet will be described in detail with reference to FIGS. 10A and 10B.

Hereinafter, a particular operation example of the interface between the host device 100 and the storage device 200 according to example embodiments of the inventive concepts will be described. In the following example embodiments, a host device and a storage device, which use the UFS interface, will be described below, but as described above, the example embodiments of the inventive concepts may be applied to various types of interfaces other than the UFS interface.

Figure 4:
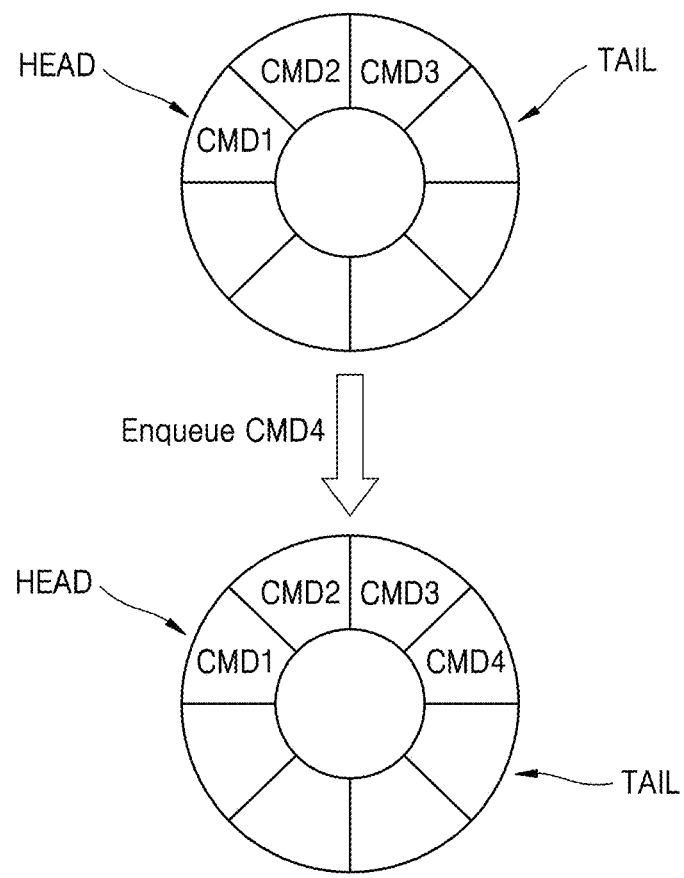
FIG. 4 is a diagram for explaining a process of writing a command to a queue, according to example embodiments of the inventive concepts.

FIG. 4 is a diagram illustrating a process of writing a command to a circular queue, according to example embodiments of the inventive concepts. The circular queue illustrated in FIG. 4 may be applied to the SQ and/or the CQ disclosed in FIGS. 1 and 2. Descriptions will be made with reference to FIGS. 1 and 2 together.

The circular queue is an arrangement in which a start and an end are connected and is a data structure in which data may be inserted and deleted. Initial values of a head HEAD and a tail TAIL of the circular queue are 0, and when a value of the head is the same as a value of the tail, the circular queue is interpreted as empty. In a state in which values of the head HEAD and the tail TAIL are each 0, new data (e.g., a command) may be written. The new data (e.g., a command) may be written to a space indicated by the tail TAIL.

Referring to FIG. 4, it is assumed that there are eight writeable spaces in the circular queue, and a first command CMD1, a second command CMD2, and a third command CMD3 are written.

A command may be written in a space indicated by the tail TAIL, and a value of a pointer may increase by one each time when one command is to be written. For example, the value of the head HEAD may be 0, and after the first to third commands CMD1 to CMD3 are written, the value of the tail TAIL may be 3. That is, the tail TAIL may indicate a space in which a command is to be written, and after data is written, the value of the tail TAIL may increase to indicate a space right after a space in which data is written. According to example embodiments, as the first command CMD1, the second command CMD2, and the third command CMD3 are sequentially written, the tail TAIL may increase by one for each command, and may indicate a space right after the third command CMD3 as the third command CMD3 is written.

In example embodiments, a fourth command CMD4 may be written to the circular queue (Enqueue CMD4). The head HEAD may maintain an initial value of 0, and the tail TAIL may increase the value by one as a new command is written (++TAIL). Accordingly, the tail TAIL may indicate a space right after the fourth command CMD4.

As the commands are sequentially written to the circular queue as describe above, the head HEAD remains the same and the value of tail TAIL is increased by one (++TAIL). When a value+1 of the tail TAIL is equal to the value of the head HEAD, the circular queue is interpreted as full. In example embodiments, because a queue depth, which is data storage capacity of the circular queue, is limited, the value of the tail TAIL may be allocated in a wrap-around method that recycles an existing address. For example, when the queue depth of the circular queue is N, as the value of the tail TAIL increased is N, the tail TAIL may have 0 as a value corresponding to an address again. As described above, because the circular queue has a characteristic that a next address after a last address becomes a first address, the circular queue is beneficial to a limited data space allocation environment and is easy to be implemented.

According to example embodiments of the inventive concepts, the SQ and/or the CQ of FIGS. 1 and 2 may be implemented as a circular queue. When a circular queue structure is used, a command (or a response) may be easily written to an SQ and/or a CQ by simply increasing a tail pointer, which is an address of a writing space indicated by the tail TAIL, by one (++TAIL). Similarly, a written command (or response) may be easily removed from the SQ and/or the CQ by increasing a head pointer by 1 (++HEAD).

Hereinafter, it is assumed that an SQ and/or a CQ according to example embodiments of the inventive concepts are implemented as the circular queue.

Figure 5A:
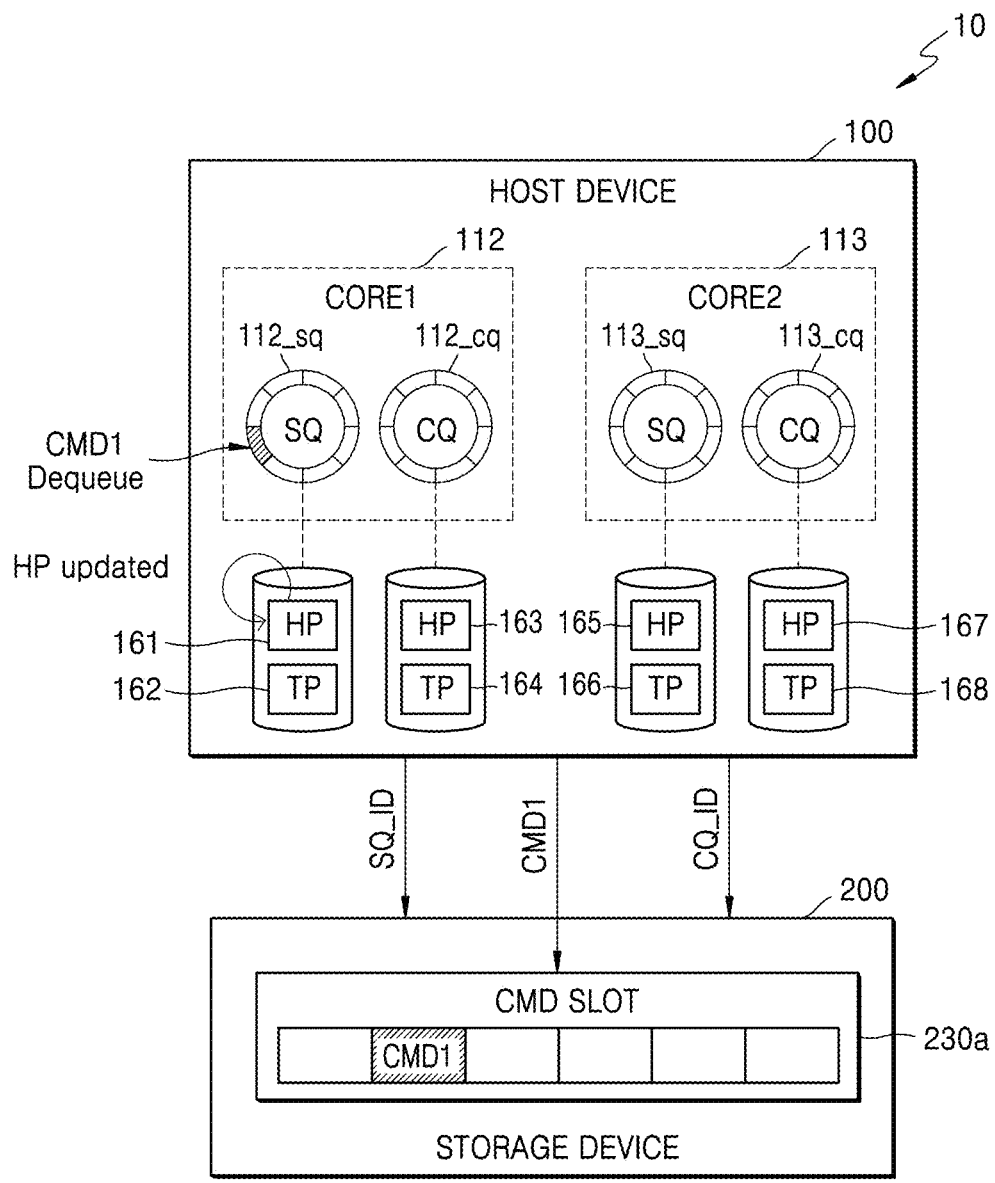
FIG. 5A is a diagram of an electronic device to which a command is written, according to example embodiments of the inventive concepts.

FIG. 5A is a diagram of the electronic device 10 to which a command is written, according to example embodiments of the inventive concepts, and descriptions will be made with reference to FIGS. 2 and 4 together.

Referring to FIG. 5A, the electronic device 10 may include the host device 100 and the storage device 200. The first core 112, the second core 113, and the command slot 230 of FIG. 2 may be applied to the first core 112, the second core 113, and the command slot 230 of FIG. 5, and redundant descriptions thereof are omitted.

The host device 100 may include a head pointer 161 and a tail pointer 162 of the first SQ 112_sq, a head pointer 163 and a tail pointer 164 of the first CQ 112_cq, a head pointer 165 and a tail pointer 166 of the second SQ 113_sq, and a head pointer 167 and a tail pointer 168 of the second CQ 113_cq.

According to example embodiments of the inventive concepts, as a result of fetching the first SQ 112_sq executed by the first core 112, the host device 100 may provide the first command CMD1 to the command slot 230. The first command CMD1 being transmitted may mean that the command accommodation limit in the command slot 230 is sufficient as a premise. The command slot 230 may insert the first command CMD1 into a writing space. Along with the transmission of the first command CMD1, the SQ ID SQ_ID indicating a transmitted command related to any of the first SQ 112_sq and the second SQ 113_sq may be transmitted to the storage device 200. In addition, the CQ ID CQ_ID indicating a transmitted command related to any of the first CQ 112_cq and the second CQ 113_cq may be transmitted to the storage device 200.

In example embodiments, after the first command CMD1 is transmitted, the head pointer 161 of the first SQ 112_sq may be updated. For example, as a value of a head of the head pointer 161 increased by one (++HEAD), the writing space indicated by the head of the first SQ 112_sq may be changed. As described in FIG. 4, the first command CMD1 that has been written in the first SQ 112_sq may be erased by increasing the head pointer 161 by one. That is, the first command CMD1 may be removed from a queue (CMD1 Dequeue).

According to example embodiments of the inventive concepts, as a storage space of the first command CMD1 is moved from the host device 100 to the storage device 200, the host device 100 no longer needs to store the first command CMD1. Due to the characteristic of the circular queue in which the writing space is limited, unnecessary commands must be removed so that new commands may be written. Accordingly, after the first command CMD1 is stored in the command slot 230, the first command CMD1 that has been written in the first SQ 112_sq may be removed from the queue by updating the head pointer 161 of the writing space (that is, the value of the head is increased by one).

Figure 5B:
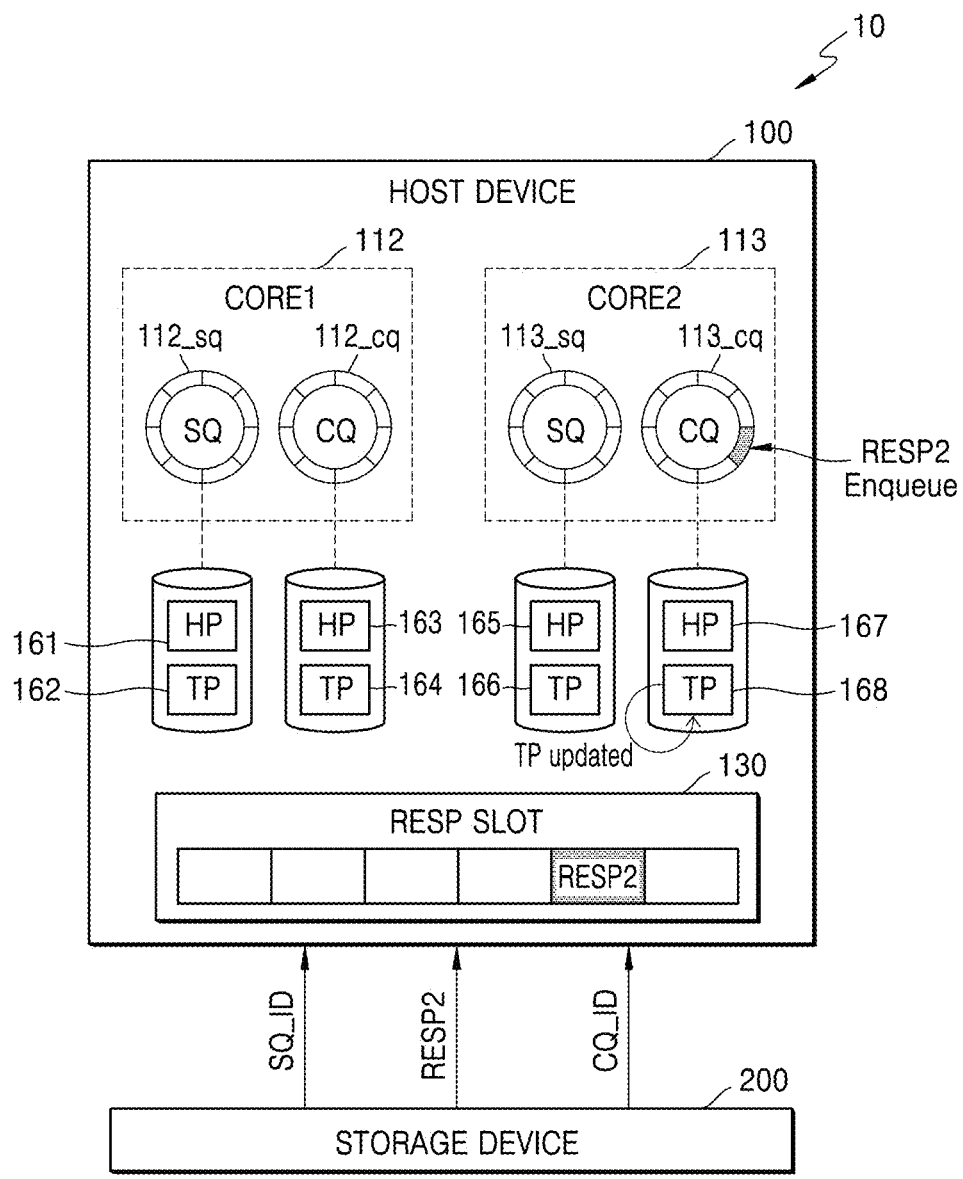
FIG. 5B is a diagram of an electronic device to which a response is written, according to example embodiments of the inventive concepts.

FIG. 5B is a diagram of the electronic device 10 to which a response is written, according to example embodiments of the inventive concepts. FIG. 5B illustrate an operation after the first command CMD1 is written according to FIG. 5A.

Referring to FIG. 5B, according to example embodiments of the inventive concepts, the storage device 200 may generate a second response RESP2 as a result of performing the first command CMD1 and provide the second response RESP2 to the response slot 130. The second response RESP2 being transmitted may mean that the response accommodation limit in the response slot 130 is sufficient. The response slot 130 may insert the second response RESP2 into a writing space. Along with the transmission of the second response RESP2, the SQ ID SQ_ID indicating a transmitted command related to which of the first SQ 112_sq and the second SQ 113_sq and the CQ ID CQ_ID indicating a transmitted command related to which of the first CQ 112_cq and the second CQ 113_cq may be transmitted to the host device 100.

In example embodiments, the response RESP may be written to a CQ corresponding to the CQ ID CQ_ID referred among a plurality of cores based on the CQ ID CQ_ID provided by the storage device 200. For example, the response RESP may be written to the second CQ 113_cq according to the CQ ID CQ_ID indicating the second CQ 113_cq loaded in the second core 113. In example embodiments, after the second response RESP2 is written, the tail pointer 168 of the second CQ 113_cq may be updated. For example, as a value of a tail of the tail pointer 168 is increased by one (++TAIL), a writing space indicated by the tail of the second CQ 113_cq may be changed. That is, the second response RESP2 may be additionally written to the second CQ 113_cq by increasing the tail pointer 168 by one (RESP2 Enqueue).

According to example embodiments, the second response RESP2 may be temporarily stored in the response slot 130 until the host device 100 (e.g., the router 117 of FIG. 2) determines whether a CQ is accessible.

FIG. 6 is a flowchart illustrating an operating method of the electronic device 10 according to example embodiments of the inventive concepts. The host device 100 and the storage device 200 of FIGS. 1 and 2 may be respectively applied to the host device 100 and the storage device 200 of FIG. 6. Descriptions will be made with reference to FIGS. 1 and 2 together.

In operation S105, the host device 100 may perform an initialization operation. In example embodiments, because the host device 100 does not have information about the storage command credit (that is, the command credit CR_CMD) of the storage device 200, the host device 100 may check an initial state of the storage device 200 before data transmission and reception.

In operation S110, the host device 100 may transmit an initial value of the response credit to the storage device 200. For example, the host device 100 may transmit a reserved command CMD to the storage device 200. However, the initialization operation is not limited to the above-stated method. For example, the host device 100 may preset the initial value of the response credit as "1" and provide response credit information to the storage device 200 by using an existing command CMD (e.g., a query request), and the storage device 200 may update the initial value of the response credit by checking the response credit information. The storage device 200 may check an initial value of the response accommodation limit of the response slot 130 (see FIG. 2) by updating the response credit.

In operation S115, the storage device 200 may provide an initial value of the command credit to the host device 100. In example embodiments, similar to operation S110, the storage device 200 may provide a reserved response RESP to the host device 100 or provide command credit information by using an existing response RESP (e.g., a query response), and the host device 100 may update the initial value of the command credit by checking the command credit information. The host device 100 may check an initial value of the command accommodation limit of the command slot 230 (see FIG. 2) by updating the host command credit based on the storage command credit.

In operation S120, the host device 100 may write the command CMD to an SQ. The host device 100 may generate the command CMD according to a user's request. The command CMD may instruct data operation (e.g., writing, reading, or erasing of data) in the storage device 200.

In operation S125, the host device 100 may check an empty space of the command slot 230 based on the host command credit (that is, the command credit CR_CMD). In example embodiments, the empty space (or an accommodation limit) of the command slot 230 may be less than the number of commands CMD generated by the host device 100, and the host device 100 may delay transmission of the command CMD until the command slot 230 may accommodate at least one command CMD.

In operation S130, the command CMD and the host response credit may be transmitted to the storage device 200 based on the host command credit. In example embodiments, the host device 100 may transmit the command CMD and the response credit CR_RESP in response to that the accommodation limit of the command slot 230 is greater than or equal to the number of commands CMD.

In operation S135, the storage device 200 may insert the command CMD to the command slot 230.

In operation S140, the storage device 200 may update the storage response credit based on the host response credit. The storage device 200 may update the storage response credit stored in the storage response register 250 based on the response credit CR_RESP corresponding to the host response credit.

In operation S145, the storage device 200 may generate the response RESP as a result of performing the command CMD. In example embodiments, the storage device 200 may generate the response RESP as a result of performing a memory operation (writing, reading, or erasing of data) corresponding to the command CMD.

In operation S150, the storage device 200 may check an empty space of the response slot 130 based on the storage response credit. In example embodiments, the empty space (or an accommodation limit) of the response slot 130 may be less than the number of responses RESP to be transmitted, and the storage device 200 may delay transmission of response RESP until the accommodation limit of the response slot 130 may accommodate at least one response RESP.

In operation S155, the storage device 200 may transmit, to the host device 100, the response RESP and the command credit CR_CMD corresponding to the storage command credit based on the storage response credit. In example embodiments, the storage device 200 may transmit the response RESP and the command credit CR_CMD in response to the accommodation limit of the response slot 130 being greater than or equal to the number or responses RESP.

In operation S160, the host device 100 may insert the response RESP into the response slot 130.

In operation S165, the host device 100 may update the host command credit based on the storage command credit. The host device 100 may update the host command credit stored in the host command register 150 based on the command credit CR_CMD corresponding to the storage command credit.

In operation S170, the response RESP may be inserted to a CQ. In example embodiments, metadata with respect to data writing may be updated by processing the response RESP written to the CQ by the host device 100.

FIG. 7 is a flowchart illustrating an operating method of the host device 100 according to example embodiments of the inventive concepts.

In operation S210, the host device 100 may write the command CMD to an SQ.

According to example embodiments, the host device 100 may perform an initialization operation after generating the command CMD according to a user's request. The command CMD may instruct a data operation (e.g., writing, reading, or erasing of data) in the storage device 200.

In operation S220, the host device 100 may check an empty space of the command slot 230 based on the host command credit.

In operation S230, the command CMD and the host response credit may be transmitted to the storage device 200 based on the host command credit. In example embodiments, the host device 100 may transmit the command CMD and the response credit CR_RESP in response to that the accommodation limit of the command slot 230 is greater than or equal to the number of commands CMD.

In operation S240, the host device 100 may receive the response RESP and the command credit CR_CMD corresponding to the storage command credit from the storage device 200.

In operation S250, the host device 100 may update the host command credit based on the storage command credit. The host device 100 may update the host command credit stored in the host command register 150 based on the command credit CR_CMD corresponding to the storage command credit.

In operation S260, the host device 100 may write the response RESP to a CQ.

In operation S270, metadata with respect to data writing may be updated by processing the response RESP written to the CQ by the host device 100.

Figure 8A:
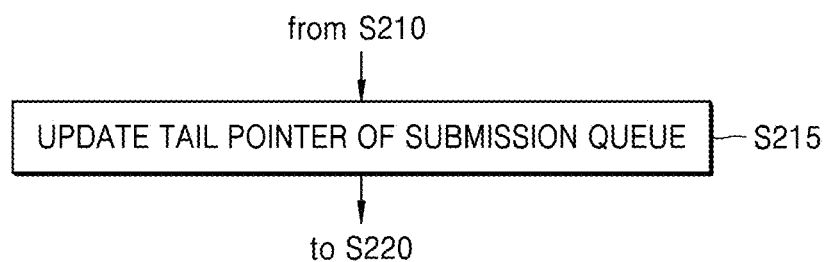
FIGS. 8A to 8C are flowcharts each illustrating example embodiments of the operating method of FIG. 7.
Figure 8B:
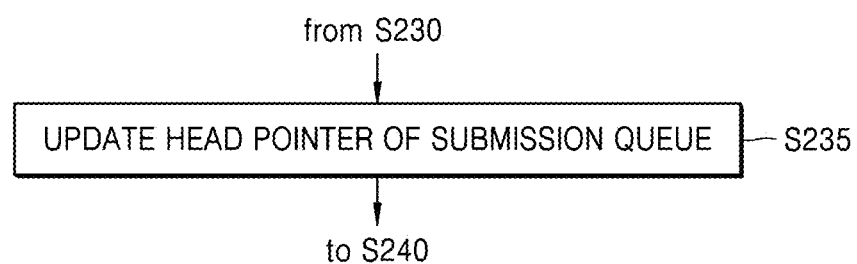
Figure 8C:
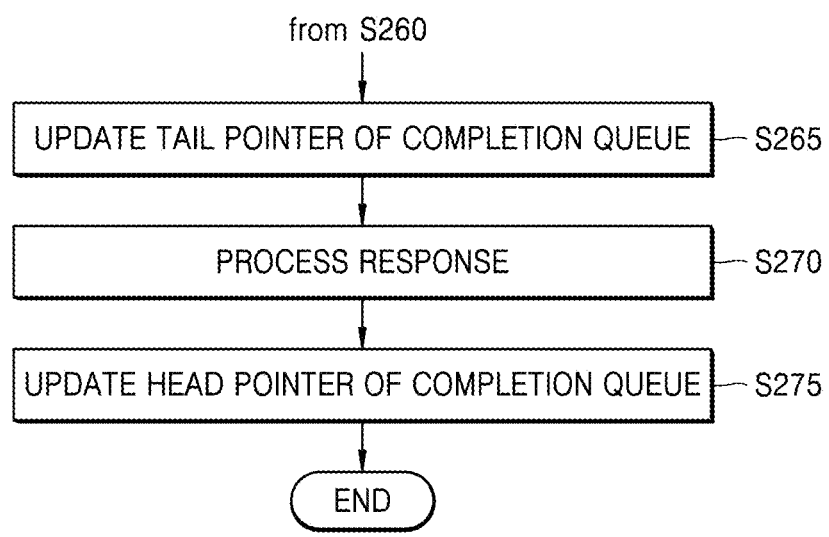

FIGS. 8A to 8C are flowcharts each illustrating example embodiments of the operating method of FIG. 7.

Referring to FIG. 8A, after operation S210, in operation S215, the host device 100 may update a tail pointer of the SQ. According to example embodiments, the host device 100 may write the command CMD to the SQ, and an address (that is, the tail pointer) of a writing space of the SQ in which the command CMD is written may be increased by one (++TAIL). Next, operation S220 is performed.

Referring to FIG. 8B, after operation S230, in operation S235, the host device 100 may update a head pointer of the SQ. According to example embodiments, the response credit CR_RESP corresponding to the host response credit may be transmitted together with the command CMD. As the command CMD is moved to the storage device 200, the command CMD unnecessarily stored in the SQ may be deleted. In example embodiments, the command CMD may be deleted from the SQ by increasing the head pointer of the SQ by 1 (++HEAD). Next, operation 240 is performed.

Referring to FIG. 8C, in operation S265 after operation 260, a tail pointer of the CQ may be updated. In example embodiments, the response RESP may be written to the CQ, and accordingly, the address of the writing space of the CQ may be changed.

In operation S270, metadata with respect to data writing may be updated by processing the response RESP written to the CQ by the host device 100.

In operation S275, as the response RESP is processed, a head pointer of the CQ may be updated. In example embodiments, the response RESP stored in the CQ may be removed.

Figure 9:
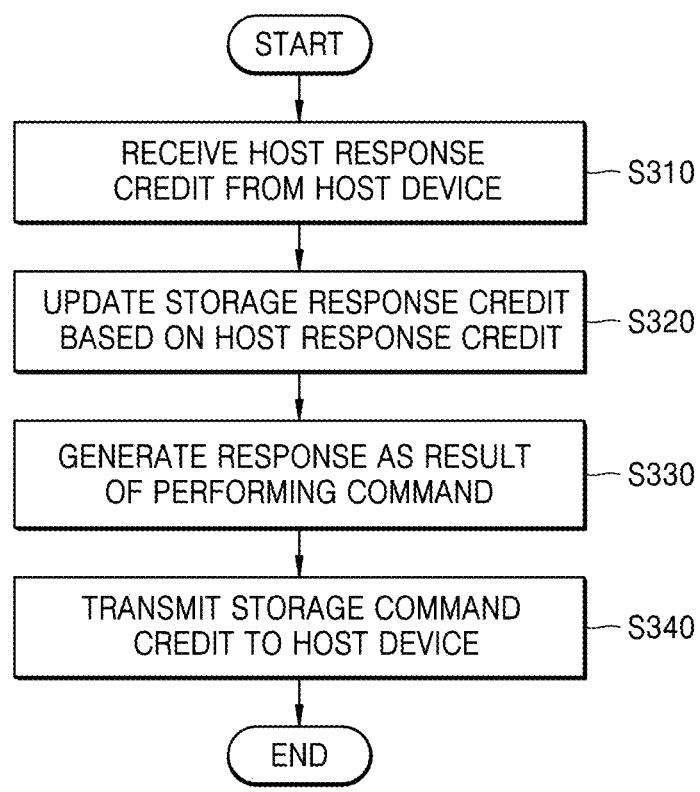
FIG. 9 is a flowchart illustrating an operating method of a storage device according to example embodiments.

FIG. 9 is a flowchart illustrating an operating method of the storage device 200 according to example embodiments of the inventive concepts.

In operation S310, the storage device 200 may receive the command CMD and the host response credit from the host device 100.

In operation S320, the storage device 200 may update the storage response credit based on the host response credit. The storage device 200 may update the storage response credit stored in the storage response register 250 based on the response credit CR_RESP corresponding to the host response credit.

In operation S330, the storage device 200 may generate the response RESP as a result of performing the command CMD. In example embodiments, the storage device 200 may generate the response RESP as a result of performing a memory operation (writing, reading, or erasing of data) corresponding to the command CMD.

In operation S340, the storage device 200 may transmit the response RESP and the command credit CR_CMD corresponding to the storage command credit to the host device 100 as a result of checking the empty space of the response slot 130 based on the storage response credit. In example embodiments, the storage device 200 may transmit the response RESP and the command credit CR_CMD in response to that the accommodation limit of the response slot 130 is greater than or equal to the number or responses RESP.

FIGS. 10A and 10B are diagrams each illustrating a structure of a packet according to example embodiments of the inventive concepts. Descriptions will be made with reference to FIG. 1.

Referring to FIG. 10A, components of the command packet PACKET_C transmitted to the storage device 200 from the host device 100 adopting the UFS standard may include the SQ ID SQ_ID, the CQ ID CQ_ID, and the response credit CR_RESP.

The SQ ID SQ_ID indicating a transmitted command related to which of a plurality of SQs and the CQ ID CQ_ID indicating a transmitted command related to which of a plurality of CQs are transmitted from the host device 100 to the storage device 200.

In example embodiments, initialization of the host device 100 may be performed by using a reserved command.

Referring to FIG. 10B, components of the response packet PACKET_R transmitted to the host device 100 from the storage device 200 adopting the UFS standard may include the SQ_ID SQ_ID, the CQ ID CQ_ID, and the command credit CR_CMD.

Figure 11:
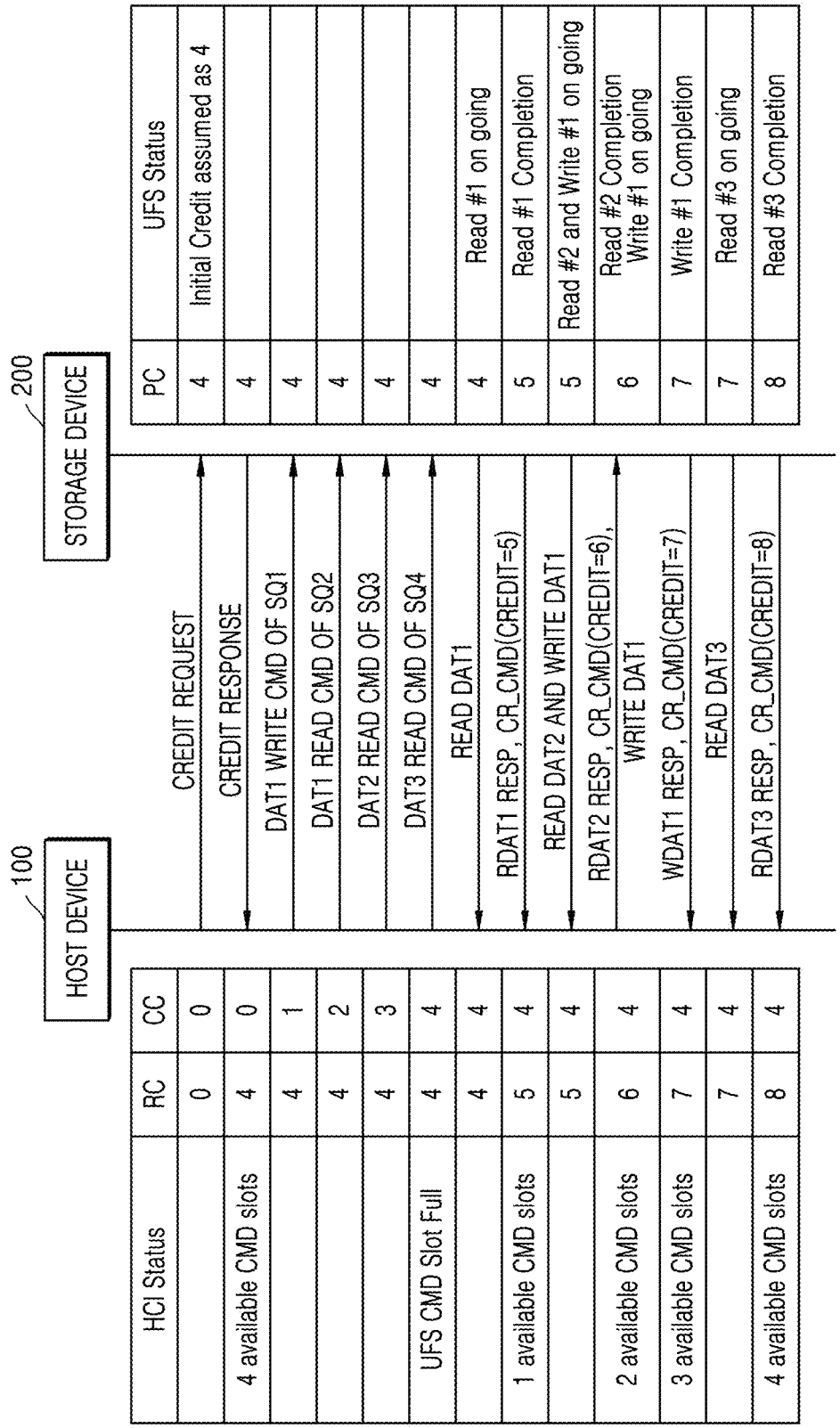
FIG. 11 is a diagram illustrating an operating method of a host device and a storage device according to example embodiments of the inventive concepts.

FIG. 11 is a diagram illustrating an operating method of the host device 100 and the storage device 200 according to example embodiments of the inventive concepts. Referring to FIG. 11, credit transmission between the host device 100 and the storage device 200 is shown with reference to a table.

In FIG. 11, RC may mean credits received by the host device 100, CC may mean credits used by the host device 100, and PC may mean credits generated by the storage device 200.

According to example embodiments of the inventive concepts, a command accommodation ability of the command slot 230 may be defined by Equation 1 below.

[Equation 1]

$$\text{Avail Slot} = (RC - CC + 2^{Credit\ bits}) \bmod 2^{credit\ bits}$$

Referring to Equation 1, the credit transmission between the host device 100 and the storage device 200 is described below.

Before initialization, the host device 100 does not have RC and CC. It is assumed that the storage device 200 has 4 initial credits.

In response to a credit request from the host device 100, the RC of the host device 100 (particularly, the host controller interface (HCI)) increases from zero to four.

Thereafter, the host device 100 may sequentially transmit, to the storage device 200, a first data write command of a first SQ, a first data read command of a second SQ, a second data read command of a third SQ, and a third data read command of a fourth SQ. As four commands are sequentially transmitted, the CC of the host device 100 may increase from zero to four. At this time, the command slot 230 of the storage device 200 is full. (RC=4, CC=4)

Thereafter, the storage device 200 may read first data to the host device 100. As the reading of the first data is completed, a response RDATA1 RESP with respect to a first data reading operation may be generated, and the response RDATA1 RESP may be transmitted to the host device 100 together with the command credit CR_CMD (CR_CMD=5). As a result, the RC of the host device 100 may increase by one, and the accommodation limit of the command slot 230 become one from zero. The PC of the storage device 200 may increase by one from four to five.

Thereafter, while second data is read to the host device 100, the first data may be written together. Accordingly, the reading of the second data may be completed, and a response RDAT2 RESP, with respect to the reading of the second data, and the command credit CR_CMD may be transmitted to the host device 100. Accordingly, the PC may increase from five to six. On the contrary, because a write operation of the first data is not completed, a write operation between the host device 100 and the storage device 200 may continue to perform. As a result, the RC of the host device 100 may increase by one from five to six, and the accommodation of the command slot 230 may be two.

Thereafter, the write operation of the first data may be completed, and a first data write response WDAT1 RESP corresponding thereto may be transmitted to the host device 100 together with the command credit CR_CMD. As the write operation of the first data is completed, the PC may increase by one to become seven, the RC may increase by one to become seven, and the accommodation limit of the command slot 230 may be three.

Thereafter, third data may be read from the storage device 200 to the host device 100. A response RDAT3 RESP, which is a result of the reading of the third data, may be transmitted to the host device 100 together with the command credit CR_CMD. As a read operation of the third data is completed, the PC may increase by one to become eight, the RC may increase by one to become eight, and the accommodation limit of the command slot 230 may be four.

Figure 12:
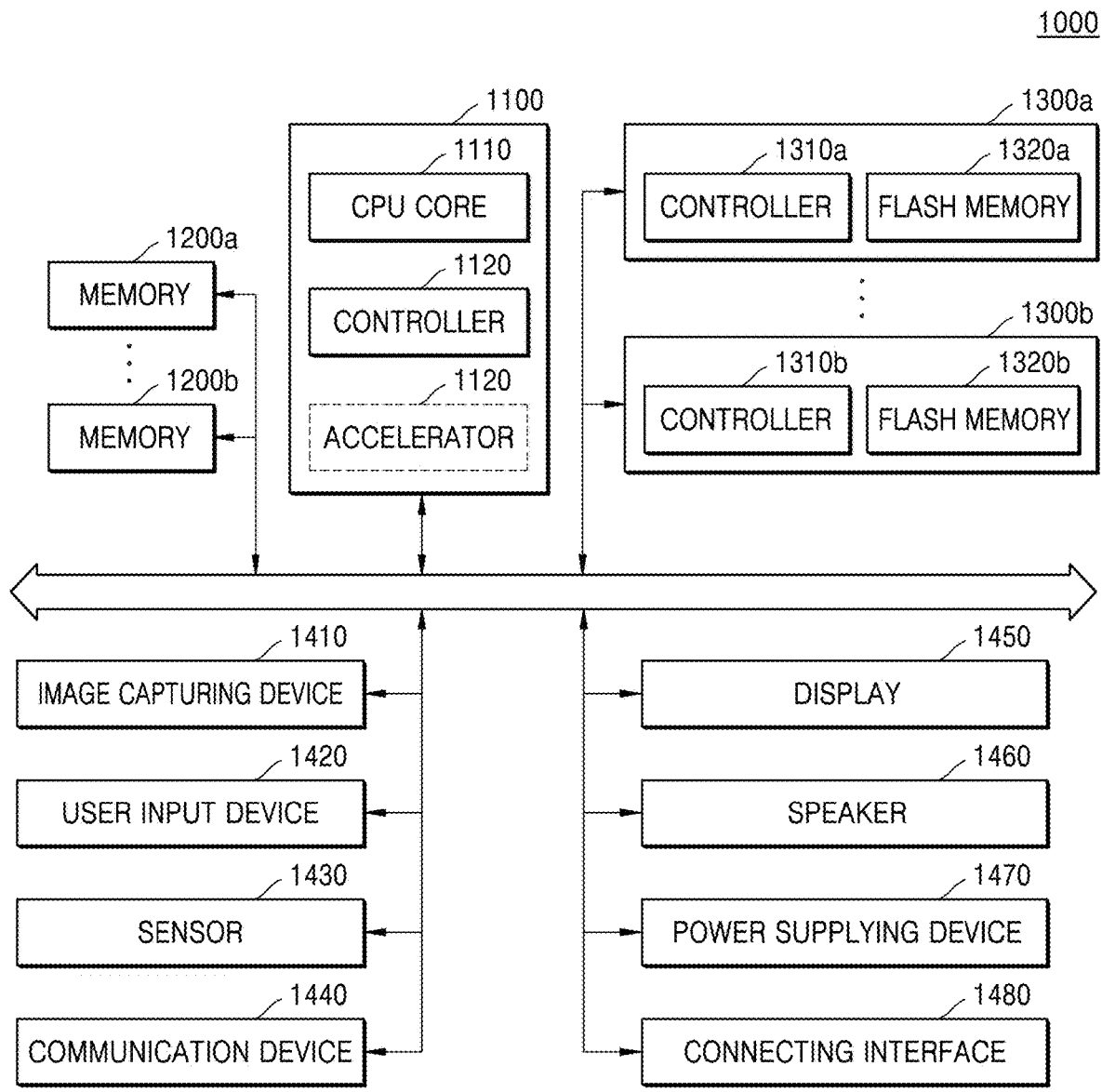
FIG. 12 is a block diagram of a system to which a storage device is applied, according to example embodiments of the inventive concepts.

FIG. 12 is a diagram of a system 1000 to which a storage device 200 is applied, according to example embodiments. The system 1000 of FIG. 12 may basically be a mobile system, such as a portable communication terminal (e.g., a mobile phone), a smartphone, a tablet personal computer (PC), a wearable device, a healthcare device, or an Internet of things (IOT) device. However, the system 1000 of FIG. 12 is not necessarily limited to the mobile system and may be a PC, a laptop computer, a server, a media player, an automotive device (e.g., a navigation device), etc.

Referring to FIG. 12, the system 1000 may include a main processor 1100, memories (e.g., 1200a and 1200b), and storage devices (e.g., 1300a and 1300b). In addition, the system 1000 may include at least one of an image capturing device 1410, a user input device 1420, a sensor 1430, a communication device 1440, a display 1450, a speaker 1460, a power supplying device 1470, and a connecting interface 1480.

The main processor 1100 may control operations (e.g., all operations) of the system 1000, for example, operations of other components included in the system 1000. The main processor 1100 may be implemented as a general-purpose processor, a dedicated processor, or an application processor.

The main processor 1100 may include at least one CPU core 1110 and further include a controller 1120 configured to control the memories 1200a and/or 1200b and/or the storage devices 1300a and/or 1300b. In some example embodiments, the main processor 1100 may further include an accelerator 1130, which is a dedicated circuit for a high-speed data operation, such as an artificial intelligence (AI) data operation. The accelerator 1130 may include a graphics processing unit (GPU), a neural processing unit (NPU) and/or a data processing unit (DPU) and be implemented as a chip that is physically separate from the other components of the main processor 1100.

The memories 1200a and/or 1200b may be used as main memory devices of the system 1000. Although each of the memories 1200a and 1200b may include a volatile memory, such as static random access memory (SRAM) and/or dynamic RAM (DRAM), each of the memories 1200a and 1200b may include non-volatile memory, such as a flash memory, phase-change RAM (PRAM) and/or resistive RAM (RRAM). The memories 1200a and/or 1200b may be implemented in the same package as the main processor 1100.

The storage devices 1300a and/or 1300b may serve as non-volatile storage devices configured to store data regardless of whether power is supplied thereto, and have larger storage capacity than the memories 1200a and/or 1200b. The storage devices 1300a and/or 1300b may respectively include storage controllers (STRG CTRL) 1310a and 1310b and NVMs (Non-Volatile Memory) 1320a and/or 1320b configured to store data via the control of the storage controllers 1310a and/or 1310b. Although the NVMs 1320a and/or 1320b may include V-NAND flash memories having a two-dimensional (2D) structure or a three-dimensional (3D) structure, the NVMs 1320a and 1320b may include other types of NVMs, such as PRAM and/or RRAM.

The storage devices 1300a and/or 1300b may be physically separated from the main processor 1100 and included in the system 1000 or implemented in the same package as the main processor 1100. In addition, the storage devices 1300a and/or 1300b may have types of solid-state devices (SSDs) or memory cards and be removably combined with other components of the system 100 through an interface, such as the connecting interface 1480 that will be described below. The storage devices 1300a and/or 1300b may be devices to which a standard protocol, such as a universal flash storage (UFS), an embedded multi-media card (eMMC), or an NVM express (NVMe), is applied, without being limited thereto.

The image capturing device 1410 may capture still images or moving images. The image capturing device 1410 may include a camera, a camcorder, and/or a webcam.

The user input device 1420 may receive various types of data input by a user of the system 1000 and include a touch pad, a keypad, a keyboard, a mouse, a microphone, etc.

The sensor 1430 may detect various types of physical quantities, which may be obtained from the outside of the system 1000, and convert the detected physical quantities into electric signals. The sensor 1430 may include a temperature sensor, a pressure sensor, an illuminance sensor, a position sensor, an acceleration sensor, a biosensor, and/or a gyroscope sensor.

The communication device 1440 may transmit and receive signals between other devices outside the system 1000 according to various communication protocols. The communication device 1440 may include an antenna, a transceiver, a modem, etc.

The display 1450 and the speaker 1460 may serve as output devices configured to respectively output visual information and auditory information to the user of the system 1000.

The power supplying device 1470 may appropriately convert power supplied from a battery (not shown) embedded in the system 1000 and/or an external power source, and supply the converted power to each, or one or more, of components of the system 1000.

The connecting interface 1480 may provide connection between the system 1000 and an external device, which is connected to the system 1000 and capable of transmitting and receiving data to and from the system 1000. The connecting interface 1480 may be implemented by using various interface schemes, such as advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, a universal serial bus (USB) interface, a secure digital (SD) card interface, a multi-media card (MMC) interface, an eMMC interface, a UFS interface, an embedded UFS (eUFS) interface, a compact flash (CF) card interface, etc.

Figure 13:
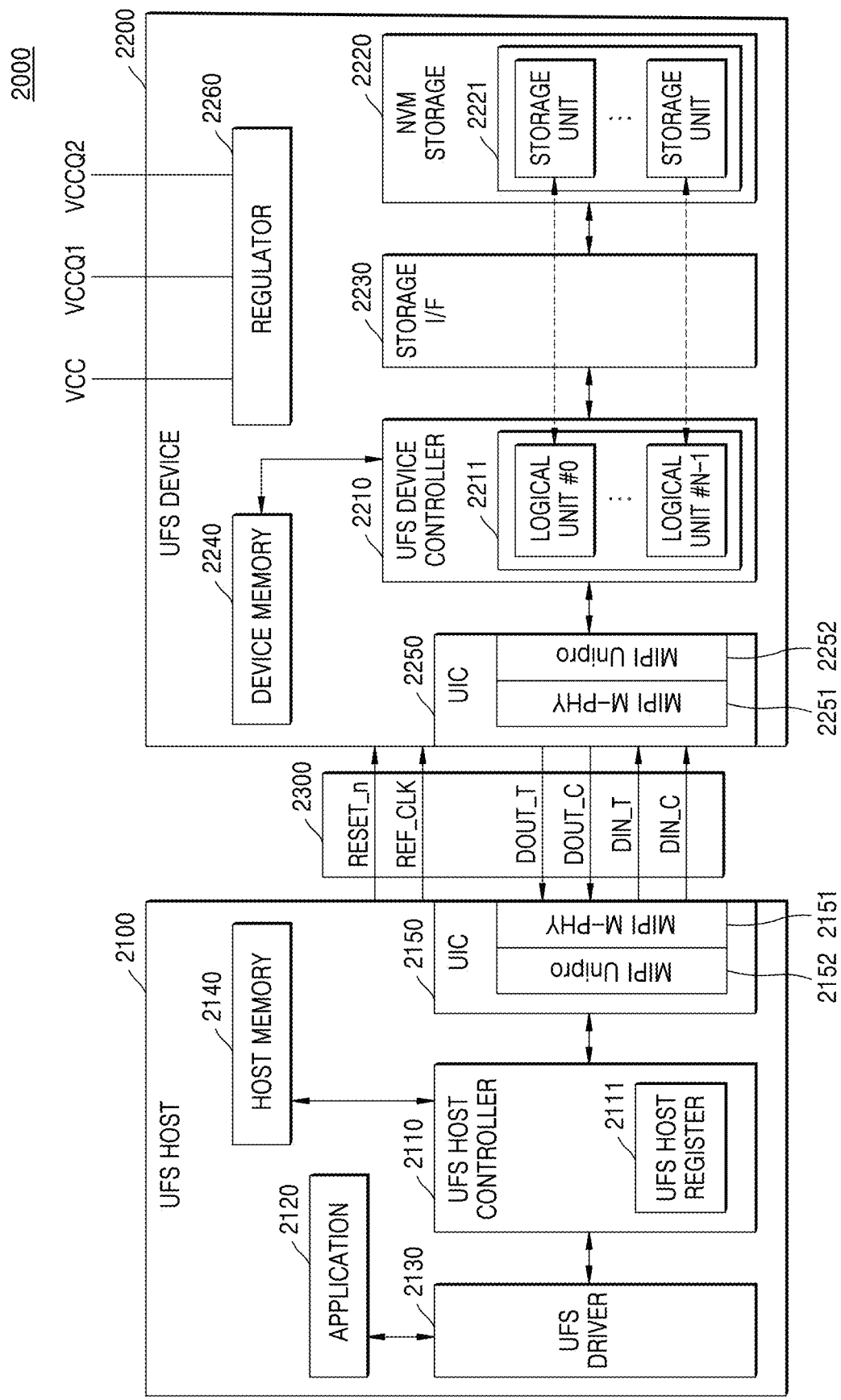
FIG. 13 is a block diagram of a UFS system according to example embodiments of the inventive concepts.

FIG. 13 is a diagram of a UFS system 2000 according to example embodiments. The UFS system 2000 may be a system conforming to a UFS standard announced by Joint Electron Device Engineering Council (JEDEC) and include a UFS host 2100, a UFS device 2200, and/or a UFS interface 2300. The above description of the system 1000 of FIG. 12 may also be applied to the UFS system 2000 of FIG. 13 within a range that does not conflict with the following description of FIG. 13.

Referring to FIG. 13, the UFS host 2100 may be connected to the UFS device 2200 through the UFS interface 2300. When the main processor 1100 of FIG. 12 is an AP, the UFS host 2100 may be implemented as a portion of the AP. The UFS host controller 2110 and the host memory 2140 may respectively correspond to the controller 1120 of the main processor 1100 and the memories 1200a and 1200b of FIG. 12. The UFS device 2200 may correspond to the storage device 1300a and 1300b of FIG. 12, and a UFS device controller 2210 and an NVM 2220 may respectively correspond to the storage controllers 1310a and 1310b and the NVMs 1320a and 1320b of FIG. 12.

The UFS host 2100 may include a UFS host controller 2110, an application 2120, a UFS driver 2130, a host memory 2140, and/or a UFS interconnect (UIC) layer 2150. The UFS device 2200 may include the UFS device controller 2210, the NVM 2220, a storage interface 2230, a device memory 2240, a UIC layer 2250, and/or a regulator 2260. The NVM 2220 may include a plurality of memory units 2221. Although each, or one or more, of the memory units 2221 may include a V-NAND flash memory having a 2D structure or a 3D structure, each, or one or more, of the memory units 2221 may include another kind of NVM, such as PRAM and/or RRAM. The UFS device controller 2210 may be connected to the NVM 2220 through the storage interface 2230. The storage interface 2230 may be configured to comply with a standard protocol, such as Toggle or ONFI.

The application 2120 may refer to a program that wants to communicate with the UFS device 2200 to use functions of the UFS device 2200. The application 2120 may transmit input-output requests (IORs) to the UFS driver 2130 for input/output (I/O) operations on the UFS device 2200. The IORs may refer to a data read request, a data storage (or write) request, and/or a data erase (or discard) request, without being limited thereto.

The UFS driver 2130 may manage the UFS host controller 2110 through a UFS-host controller interface (UFS-HCI). The UFS driver 2130 may convert the IOR generated by the application 2120 into a UFS command defined by the UFS standard and transmit the UFS command to the UFS host controller 2110. One IOR may be converted into a plurality of UFS commands. Although the UFS command may basically be defined by an SCSI standard, the UFS command may be a command dedicated to the UFS standard.

The UFS host controller 2110 may transmit the UFS command converted by the UFS driver 2130 to the UIC layer 2250 of the UFS device 2200 through the UIC layer 2150 and the UFS interface 2300. During the transmission of the UFS command, a UFS host register 2111 of the UFS host controller 2110 may serve as a command queue (CQ).

The UIC layer 2150 on the side of the UFS host 2100 may include a mobile industry processor interface (MIPI) M-PHY 2151 and an MIPI UniPro 2152, and the UIC layer 2250 on the side of the UFS device 2200 may also include an MIPI M-PHY 2251 and an MIPI UniPro 2252.

The UFS interface 2300 may include a line configured to transmit a reference clock signal REF_CLK, a line configured to transmit a hardware reset signal RESET_n for the UFS device 2200, a pair of lines configured to transmit a pair of differential input signals DIN_t and DIN_c, and a pair of lines configured to transmit a pair of differential output signals DOUT_t and DOUT_c.

A frequency of a reference clock signal REF_CLK provided from the UFS host 2100 to the UFS device 2200 may be one of 19.2 MHz, 26 MHz, 38.4 MHz, and 52 MHz, without being limited thereto. The UFS host 2100 may change the frequency of the reference clock signal REF_CLK during an operation, that is, during data transmission/receiving operations between the UFS host 2100 and the UFS device 2200. The UFS device 2200 may generate clock signals having various frequencies from the reference clock signal REF_CLK provided from the UFS host 2100, by using a phase-locked loop (PLL). Also, the UFS host 2100 may set a data rate between the UFS host 2100 and the UFS device 2200 by using the frequency of the reference clock signal REF_CLK. That is, the data rate may be determined depending on the frequency of the reference clock signal REF_CLK.

The UFS interface 2300 may support a plurality of lanes, each, or one or more, of which may be implemented as a pair of differential lines. For example, the UFS interface 2300 may include at least one receiving lane and at least one transmission lane. In FIG. 13, a pair of lines configured to transmit a pair of differential input signals DIN_T and DIN_C may constitute a receiving lane, and a pair of lines configured to transmit a pair of differential output signals DOUT_T and DOUT_C may constitute a transmission lane. Although one transmission lane and one receiving lane are illustrated in FIG. 13, the number of transmission lanes and the number of receiving lanes may be changed.

The receiving lane and the transmission lane may transmit data based on a serial communication scheme. Full-duplex communications between the UFS host 2100 and the UFS device 2200 may be enabled due to a structure in which the receiving lane is separated from the transmission lane. That is, while receiving data from the UFS host 2100 through the receiving lane, the UFS device 2200 may transmit data to the UFS host 2100 through the transmission lane. In addition, control data (e.g., a command) from the UFS host 2100 to the UFS device 2200 and user data to be stored in or read from the NVM 2220 of the UFS device 2200 by the UFS host 2100 may be transmitted through the same lane. Accordingly, between the UFS host 2100 and the UFS device 2200, there may be no need to further provide a separate lane for data transmission in addition to a pair of receiving lanes and a pair of transmission lanes.

The UFS device controller 2210 of the UFS device 2200 may control operations (e.g., all operations) of the UFS device 2200. The UFS device controller 2210 may manage the NVM 2220 by using a logical unit (LU) 2211, which is a logical data storage unit. The number of LUs 2211 may be 8, without being limited thereto. The UFS device controller 2210 may include an FTL and convert a logical data address (e.g., a logical block address (LBA)) received from the UFS host 2100 into a physical data address (e.g., a physical block address (PBA)) by using address mapping information of the FTL. A logical block configured to store user data in the UFS system 2000 may have a size in a predetermined or alternatively, desired range. For example, a minimum size of the logical block may be set to 4 Kbyte.

When a command from the UFS host 2100 is applied through the UIC layer 2250 to the UFS device 2200, the UFS device controller 2210 may perform an operation in response to the command and transmit a completion response to the UFS host 2100 when the operation is completed.

As an example, when the UFS host 2100 intends to store user data in the UFS device 2200, the UFS host 2100 may transmit a data storage command to the UFS device 2200. When a response (a 'ready-to-transfer' response) indicating that the UFS host 2100 is ready to receive user data (ready-to-transfer) is received from the UFS device 2200, the UFS host 2100 may transmit user data to the UFS device 2200. The UFS device controller 2210 may temporarily store the received user data in the device memory 2240 and store the user data, which is temporarily stored in the device memory 2240, at a selected position of the NVM 2220 based on the address mapping information of the FTL.

As another example, when the UFS host 2100 intends to read the user data stored in the UFS device 2200, the UFS host 2100 may transmit a data read command to the UFS device 2200. The UFS device controller 2210, which has received the command, may read the user data from the NVM 2220 based on the data read command and temporarily store the read user data in the device memory 2240. During the read operation, the UFS device controller 2210 may detect and correct an error in the read user data by using an ECC engine (not shown) embedded therein. For example, the ECC engine may generate parity bits for write data to be written to the NVM 2220, and the generated parity bits may be stored in the NVM 2220 along with the write data. During the reading of data from the NVM 2220, the ECC engine may correct an error in read data by using the parity bits read from the NVM 2220 along with the read data, and output error-corrected read data.

In addition, the UFS device controller 2210 may transmit user data, which is temporarily stored in the device memory 2240, to the UFS host 2100. In addition, the UFS device controller 2210 may further include an AES engine (not shown). The AES engine may perform at least of an encryption operation and a decryption operation on data transmitted to the UFS device controller 2210 by using a symmetric-key algorithm.

The UFS host 2100 may sequentially store commands, which are to be transmitted to the UFS device 2200, in the UFS host register 2111, which may serve as a common queue, and sequentially transmit the commands to the UFS device 2200. In some example embodiments, even while a previously transmitted command is still being processed by the UFS device 2200, that is, even before receiving a notification that the previously transmitted command has been processed by the UFS device 2200, the UFS host 2100 may transmit a next command, which is on standby in the CQ, to the UFS device 2200. Thus, the UFS device 2200 may also receive a next command from the UFS host 2100 during the processing of the previously transmitted command. A maximum number (or queue depth) of commands that may be stored in the CQ may be, for example, 32. Also, the CQ may be implemented as a circular queue in which a start and an end of a command line stored in a queue are indicated by a head pointer and a tail pointer.

Each, or one or more, of the plurality of memory units 2221 may include a memory cell array (not shown) and a control circuit (not shown) configured to control an operation of the memory cell array. The memory cell array may include a 2D memory cell array or a 3D memory cell array. The memory cell array may include a plurality of memory cells. Although each of the memory cells is a single-level cell (SLC) configured to store 1-bit information, each, or one or more, of the memory cells may be a cell configured to store information of 2 bits or more, such as a multi-level cell (MLC), a triple-level cell (TLC), and a quadruple-level cell (QLC). The 3D memory cell array may include a vertical NAND string in which at least one memory cell is vertically oriented and located on another memory cell.

Voltages VCC, VCCQ, and/or VCCQ2 may be applied as power supply voltages to the UFS device 2200. The voltage VCC may be a main power supply voltage for the UFS device 2200 and be in a range of 2.4 V to 3.6 V. The voltage VCCQ may be a power supply voltage for supplying a low voltage mainly to the UFS device controller 2210 and be in a range of 1.14 V to 1.26 V. The voltage VCCQ2 may be a power supply voltage for supplying a voltage, which is lower than the voltage VCC and higher than the voltage VCCQ, mainly to an I/O interface, such as the MIPI M-PHY 2251, and be in a range of 1.7 V to 1.95 V. The power supply voltages may be supplied through the regulator 2260 to respective components of the UFS device 2200. The regulator 2260 may be implemented as a set of unit regulators respectively connected to different ones of the power supply voltages described above.

Figure 14A:
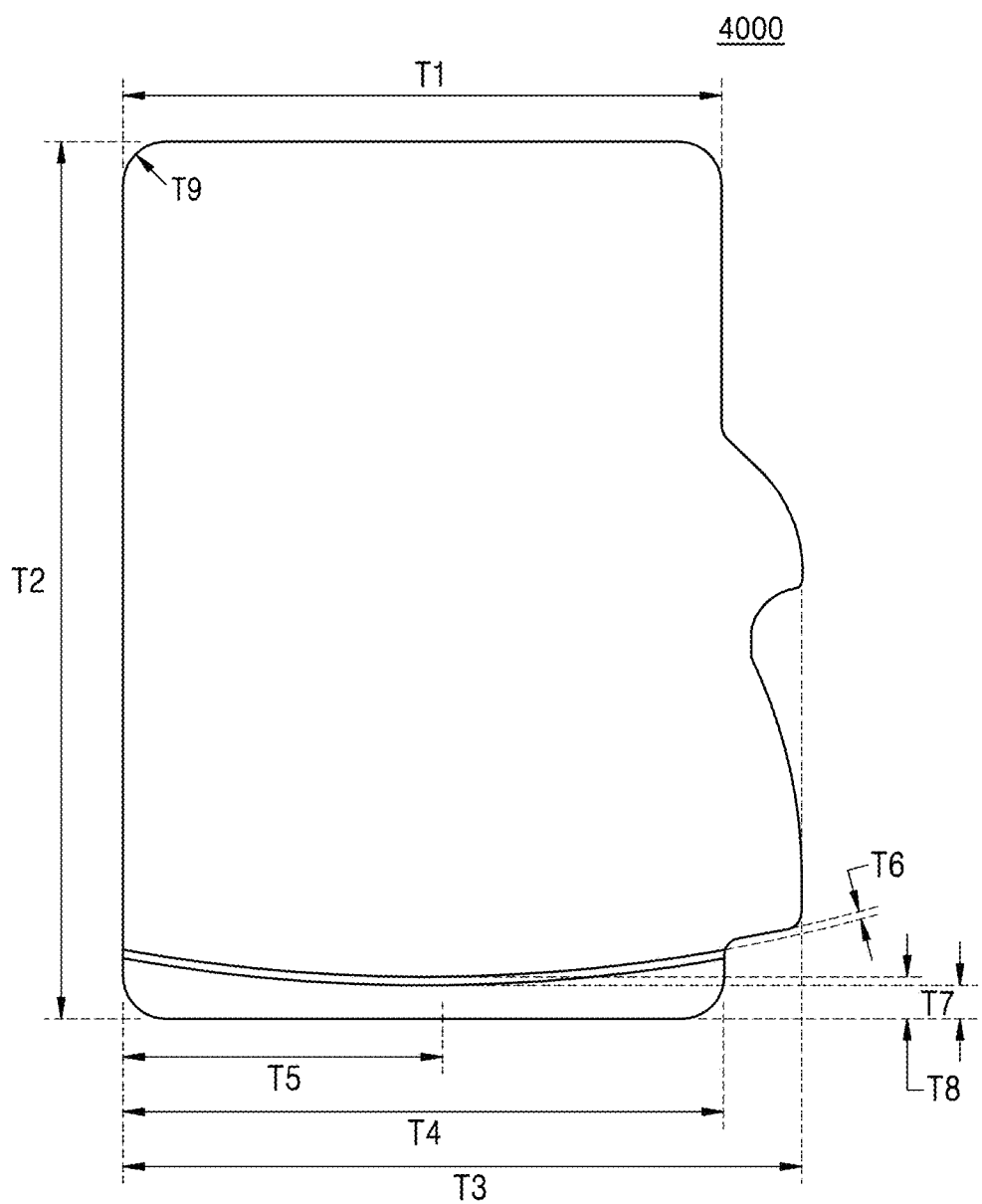
FIGS. 14A to 14C are diagrams for explaining a form factor of a UFS card according to example embodiments of the inventive concepts.
Figure 14B:
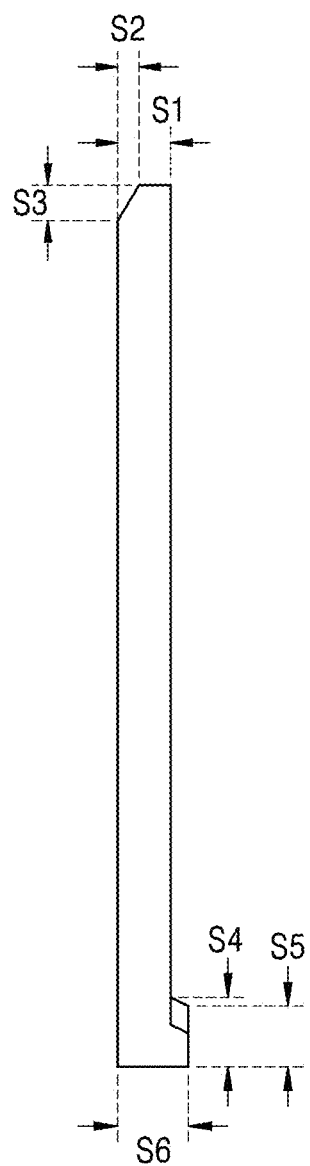
Figure 14C:
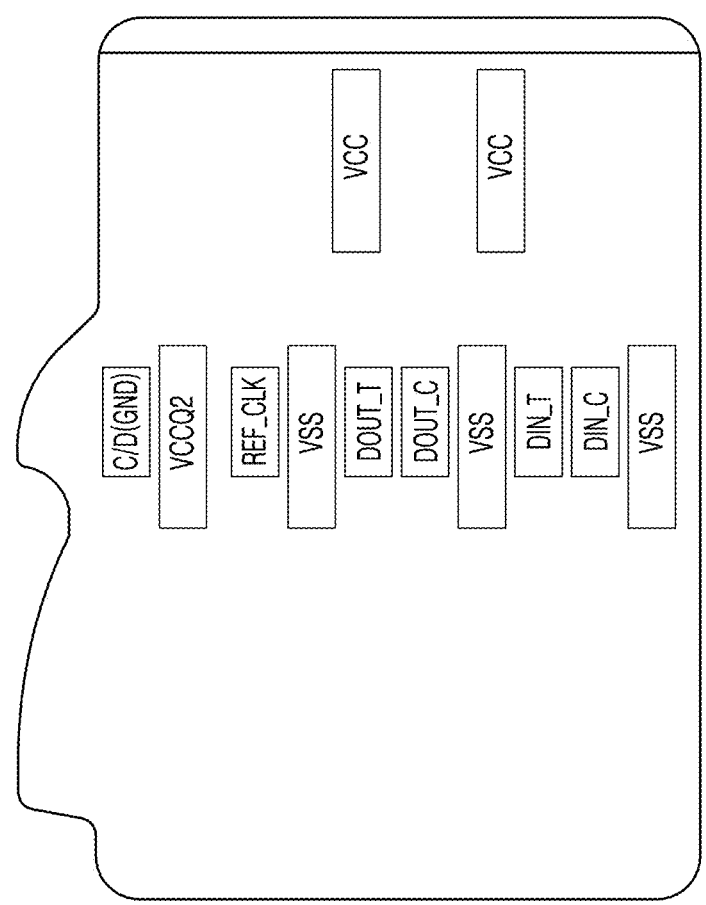

FIGS. 14A to 14C are diagrams of a form factor of a UFS card 4000. When the UFS device 2200 described with reference to FIG. 13 is implemented as the UFS card 4000, an outer appearance of the UFS card 4000 may be as shown in FIGS. 14A to 14C.

FIG. 14A is a top view of the UFS card 4000, according to example embodiments. Referring to FIG. 14A, it can be seen that the UFS card 4000 follows a shark-shaped design. In FIG. 14A, the UFS card 4000 may have dimensions shown in Table 1 below as an example.

TABLE 1

| Item | Dimension (mm) |
| --- | --- |
| T1 | 9.70 |
| T2 | 15.00 |
| T3 | 11.00 |
| T4 | 9.70 |
| T5 | 5.15 |
| T6 | 0.25 |
| T7 | 0.60 |
| T8 | 0.75 |
| T9 | R0.80 |

FIG. 14B is a side view of the UFS card 4000, according to example embodiments. In FIG. 14B, the UFS card 4000 may have dimensions shown in Table 2 below as an example.

TABLE 2

| Item | Dimension (mm) |
| --- | --- |
| S1 | 0.74 ± 0.06 |
| S2 | 0.30 |
| S3 | 0.52 |
| S4 | 1.20 |
| S5 | 1.05 |
| S6 | 1.00 |

FIG. 14C is a bottom view of the UFS card 4000, according to example embodiments. Referring to FIG. 14C, a plurality of pins for electrical contact with a UFS slot may be formed on a bottom surface of the UFS card 4000. Functions of each of the pins will be described below. Based on symmetry between a top surface and the bottom surface of the UFS card 4000, some pieces (e.g., T1 to T5 and T9) of information about the dimensions described with reference to FIG. 14A and Table 1 may also be applied to the bottom view of the UFS card 400, which is shown in FIG. 14C.

A plurality of pins for an electrical connection with a UFS host may be formed on the bottom surface of the UFS card 4000. Referring to FIG. 14C, a total number of pins may be 12. Each, or one or more, of the pins may have a rectangular shape, and signal names corresponding to the pins may be as shown in FIG. 14C. Specific information about each of the pins will be understood with reference to Table 3 below and the above description presented with reference to FIG. 2A.

TABLE 3

| Signal No. | Name | Description | Dimension (mm) |
| --- | --- | --- | --- |
| 1 | Vss | Ground (GND) | 3.00 × 0.72 ± 0.05 |
| 2 | DIN_C | Differential input signals input from a host to the UFS card 4000 (DIN_C is a negative node, and DIN_T is a positive node) | 1.50 × 0.72 ± 0.05 |
| 3 | DIN_T | | |
| 4 | Vss | Ground (GND) | 3.00 × 0.72 ± 0.05 |

TABLE 3-continued

| Signal No. | Name | Description | Dimension (mm) |
| --- | --- | --- | --- |
| 5 | DOUT_C | Differential output signals output from the UFS card 4000 to the host (DOUT_C is a negative node, and DOUT_T is a positive node) | 1.50 × 0.72 ± 0.05 |
| 6 | DOUT_T | | |
| 7 | Vss | Ground (GND) | 3.00 × 0.72 ± 0.05 |
| 8 | REF_CLK | Reference clock signal provided from the host to the UFS card 4000 | 1.50 × 0.72 ± 0.05 |
| 9 | VCCQ2 | Power supply voltage provided mainly to a PHY interface or a controller and having a lower value than voltage Vcc | 3.00 × 0.72 ± 0.05 |
| 10 | C/D(GND) | Card detection signal | 1.50 × 0.72 ± 0.05 |
| 11 | Vss | Ground (GND) | 3.00 × 0.80 ± 0.05 |
| 12 | Vcc | Main power supply voltage | |

Figure 15:
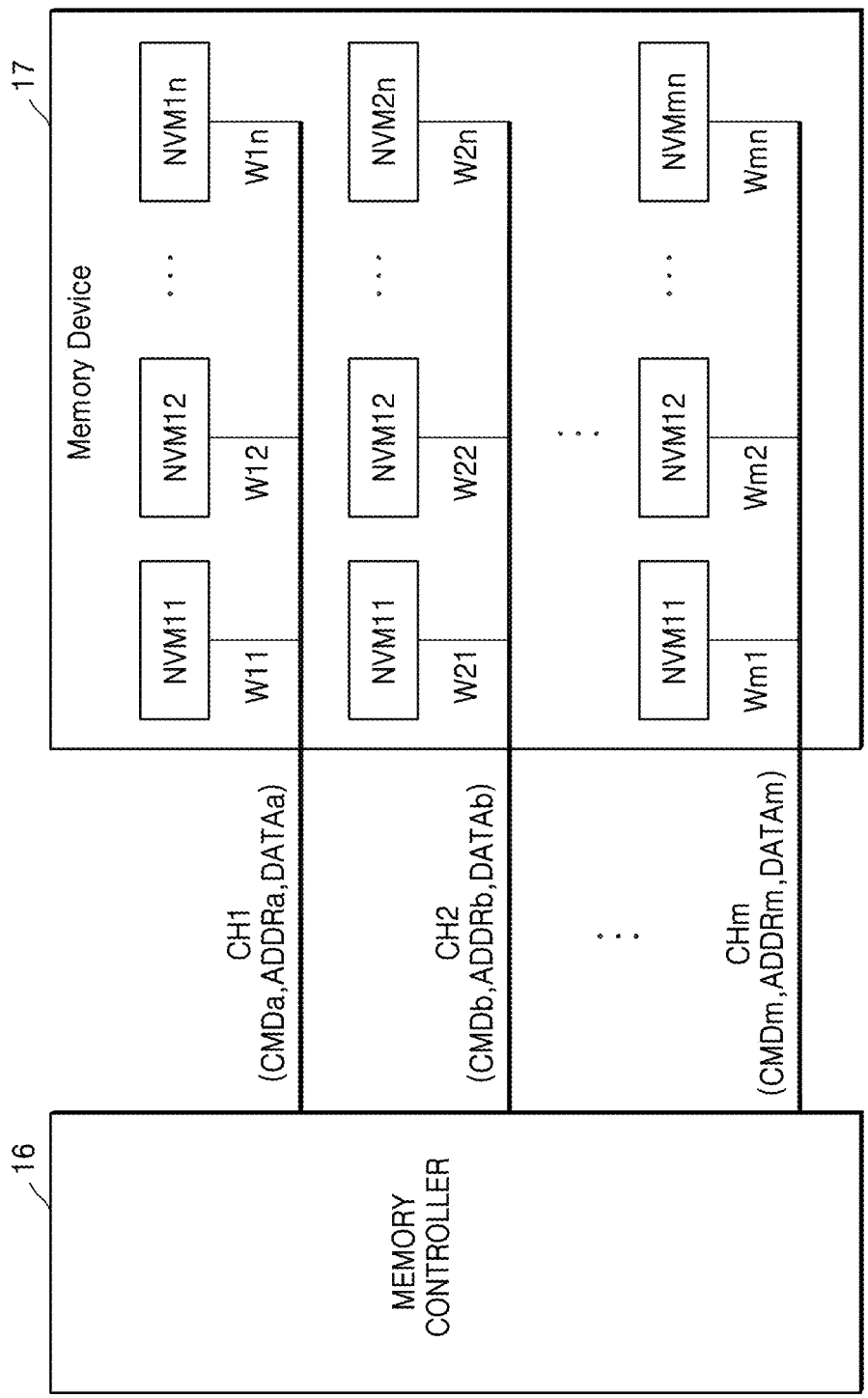
FIG. 15 is a block diagram of a storage device according to example embodiments of the inventive concepts.

FIG. 15 is a block diagram of a memory system 15 according to example embodiments. Referring to FIG. 15, the memory system 15 may include a memory device 17 and/or a memory controller 16. The memory system 15 may support a plurality of channels CH1 to CHm, and the memory device 17 may be connected to the memory controller 16 through the plurality of channels CH1 to CHm. For example, the memory system 15 may be implemented as a storage device, such as an SSD.

The memory device 17 may include a plurality of NVM devices NVM11 to NVMmn.

Each, or one or more, of the NVM devices NVM11 to NVMmn may be connected to one of the plurality of channels CH1 to CHm through a way corresponding thereto. For instance, the NVM devices NVM11 to NVM1n may be connected to a first channel CH1 through ways W11 to W1n, and the NVM devices NVM21 to NVM2n may be connected to a second channel CH2 through ways W21 to W2n. In example embodiments, each, or one or more, of the NVM devices NVM11 to NVMmn may be implemented as an arbitrary memory unit that may operate according to an individual command from the memory controller 16. For example, each, or one or more, of the NVM devices NVM11 to NVMmn may be implemented as a chip or a die, but the inventive concepts are not limited thereto.

The memory controller 16 may transmit and receive signals to and from the memory device 17 through the plurality of channels CH1 to CHm. For example, the memory controller 16 may transmit commands CMDa to CMDm, addresses ADDRa to ADDRm, and/or data DATAa to DATAm to the memory device 17 through the channels CH1 to CHm and/or receive the data DATAa to DATAm from the memory device 17.

The memory controller 16 may select one of the NVM devices NVM11 to NVMmn, which is connected to each, or one or more, of the channels CH1 to CHm, by using a corresponding one of the channels CH1 to CHm, and transmit and receive signals to and from the selected NVM device. For example, the memory controller 16 may select the NVM device NVM11 from the NVM devices NVM11 to NVM1n connected to the first channel CH1. The memory controller 16 may transmit the command CMDa, the address ADDRa, and the data DATAa to the selected NVM device NVM11 through the first channel CH1 or receive the data DATAa from the selected NVM device NVM11.

The memory controller 16 may transmit and receive signals to and from the memory device 17 in parallel through different channels. For example, the memory controller 16 may transmit a command CMDb to the memory device 17 through the second channel CH2 while transmitting a command CMDa to the memory device 17 through the first channel CH1. For example, the memory controller 16 may receive data DATAb from the memory device 17 through the second channel CH2 while receiving data DATAa from the memory device 17 through the first channel CH1.

The memory controller 16 may control operations (e.g., all operations) of the memory device 17. The memory controller 16 may transmit a signal to the channels CH1 to CHm and control each, or one or more, of the NVM devices NVM11 to NVMmn connected to the channels CH1 to CHm. For instance, the memory controller 16 may transmit the command CMDa and/or the address ADDRa to the first channel CH1 and control one selected from the NVM devices NVM11 to NVM1n.

Each, or one or more, of the NVM devices NVM11 to NVMmn may operate via the control of the memory controller 16. For example, the NVM device NVM11 may program the data DATAa based on the command CMDa, the address ADDRa, and the data DATAa provided to the first channel CH1. For example, the NVM device NVM21 may read the data DATAb based on the command CMDb and the address ADDb provided to the second channel CH2 and transmit the read data DATAb to the memory controller 16.

Although FIG. 15 illustrates an example in which the memory device 17 communicates with the memory controller 16 through m channels and includes n NVM devices corresponding to each, or one or more, of the channels, the number of channels and the number of NVM devices connected to one channel may be variously changed.

Figure 16:
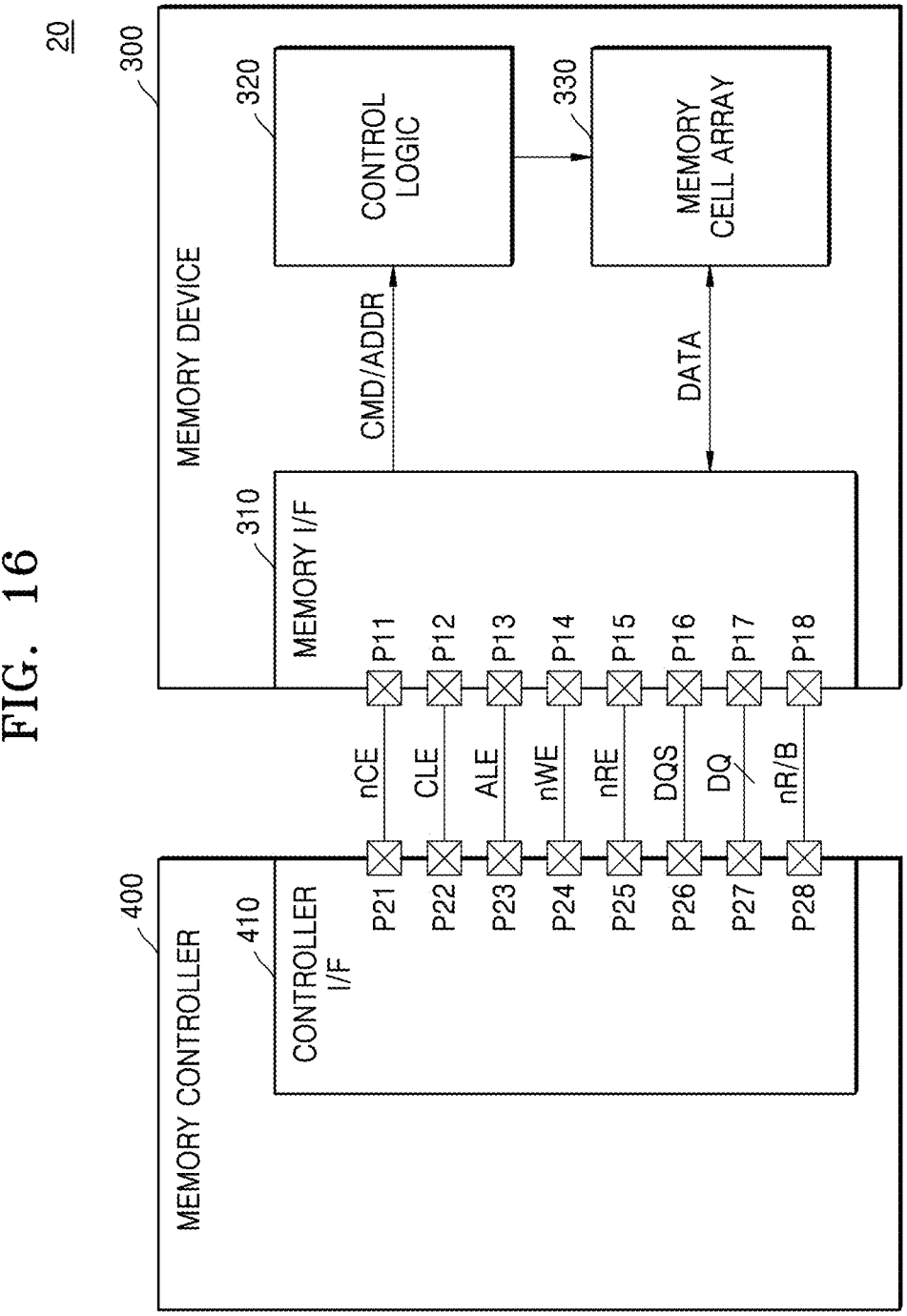
FIG. 16 is a block diagram of a storage device according to example embodiments of the inventive concepts.

FIG. 16 is a block diagram of a memory system 20 according to example embodiments. Referring to FIG. 16, the memory system 20 may include a memory device 300 and a memory controller 400. The memory device 300 may correspond to one of NVM devices NVM11 to NVMmn, which communicate with a memory controller 16 based on one of the plurality of channels CH1 to CHm of FIG. 15. The memory controller 400 may correspond to the memory controller 16 of FIG. 15.

The memory device 300 may include first to eighth pins P11 to P18, a memory interface circuitry 310, a control logic circuitry 320, and/or a memory cell array 330.

The memory interface circuitry 310 may receive a chip enable signal nCE from the memory controller 400 through the first pin P11. The memory interface circuitry 310 may transmit and receive signals to and from the memory controller 400 through the second to eighth pins P12 to P18 in response to the chip enable signal nCE. For example, when the chip enable signal nCE is in an enable state (e.g., a low level), the memory interface circuitry 310 may transmit and receive signals to and from the memory controller 400 through the second to eighth pins P12 to P18.

The memory interface circuitry 310 may receive a command latch enable signal CLE, an address latch enable signal ALE, and/or a write enable signal nWE from the memory controller 400 through the second to fourth pins P12 to P14. The memory interface circuitry 310 may receive a data signal DQ from the memory controller 400 through the seventh pin P17 or transmit the data signal DQ to the memory controller 400. A command CMD, an address ADDR, and data may be transmitted via the data signal DQ. For example, the data signal DQ may be transmitted through a plurality of data signal lines. In some example embodiments, the seventh pin P17 may include a plurality of pins respectively corresponding to a plurality of data signals DQ(s).

The memory interface circuitry 310 may obtain the command CMD from the data signal DQ, which is received in an enable section (e.g., a high-level state) of the command latch enable signal CLE based on toggle time points of the write enable signal nWE. The memory interface circuitry 310 may obtain the address ADDR from the data signal DQ, which is received in an enable section (e.g., a high-level state) of the address latch enable signal ALE based on the toggle time points of the write enable signal nWE.

In example embodiments, the write enable signal nWE may be maintained at a static state (e.g., a high level or a low level) and toggle between the high level and the low level. For example, the write enable signal nWE may toggle in a section in which the command CMD or the address ADDR is transmitted. Thus, the memory interface circuitry 310 may obtain the command CMD or the address ADDR based on toggle time points of the write enable signal nWE.

The memory interface circuitry 310 may receive a read enable signal nRE from the memory controller 400 through the fifth pin P15. The memory interface circuitry 310 may receive a data strobe signal DQS from the memory controller 400 through the sixth pin P16 or transmit the data strobe signal DQS to the memory controller 400.

In a data (DATA) output operation of the memory device 300, the memory interface circuitry 310 may receive the read enable signal nRE, which toggles through the fifth pin P15, before outputting the data DATA. The memory interface circuitry 310 may generate the data strobe signal DQS, which toggles based on the toggling of the read enable signal nRE. For example, the memory interface circuitry 310 may generate a data strobe signal DQS, which starts toggling after a predetermined or alternatively, desired delay, based on a toggling start time of the read enable signal nRE. The memory interface circuitry 310 may transmit the data signal DQ including the data DATA based on a toggle time point of the data strobe signal DQS. Thus, the data DATA may be aligned with the toggle time point of the data strobe signal DQS and transmitted to the memory controller 400.

In a data (DATA) input operation of the memory device 300, when the data signal DQ including the data DATA is received from the memory controller 400, the memory interface circuitry 310 may receive the data strobe signal DQS, which toggles, along with the data DATA from the memory controller 400. The memory interface circuitry 310 may obtain the data DATA from the data signal DQ based on toggle time points of the data strobe signal DQS. For example, the memory interface circuitry 310 may sample the data signal DQ at rising and falling edges of the data strobe signal DQS and obtain the data DATA.

The memory interface circuitry 310 may transmit a ready/busy output signal nR/B to the memory controller 400 through the eighth pin P18. The memory interface circuitry 310 may transmit state information of the memory device 300 through the ready/busy output signal nR/B to the memory controller 400. When the memory device 300 is in a busy state (e.g., when operations are being performed in the memory device 300), the memory interface circuitry 310 may transmit a ready/busy output signal nR/B indicating the busy state to the memory controller 400. When the memory device 300 is in a ready state (e.g., when operations are not performed or completed in the memory device 300), the memory interface circuitry 310 may transmit a ready/busy output signal nR/B indicating the ready state to the memory controller 400. For example, while the memory device 300 is reading data DATA from the memory cell array 330 in response to a page read command, the memory interface circuitry 310 may transmit a ready/busy output signal nR/B indicating a busy state (e.g., a low level) to the memory controller 400. For example, while the memory device 300 is programming data DATA to the memory cell array 330 in response to a program command, the memory interface circuitry 310 may transmit a ready/busy output signal nR/B indicating the busy state to the memory controller 400.

The control logic circuitry 320 may control operations (e.g., all operations) of the memory device 300. The control logic circuitry 320 may receive the command/address CMD/ADDR obtained from the memory interface circuitry 310. The control logic circuitry 320 may generate control signals for controlling other components of the memory device 300 in response to the received command/address CMD/ADDR. For example, the control logic circuitry 320 may generate various control signals for programming data DATA to the memory cell array 330 or reading the data DATA from the memory cell array 330.

The memory cell array 330 may store the data DATA obtained from the memory interface circuitry 310, via the control of the control logic circuitry 320. The memory cell array 330 may output the stored data DATA to the memory interface circuitry 310 via the control of the control logic circuitry 320.

The memory cell array 330 may include a plurality of memory cells. For example, the plurality of memory cells may be flash memory cells. However, the inventive concepts are not limited thereto, and the memory cells may be RRAM cells, FRAM cells, PRAM cells, thyristor RAM (TRAM) cells, or MRAM cells. Hereinafter, example embodiments in which the memory cells are NAND flash memory cells will mainly be described.

The memory controller 400 may include first to eighth pins P21 to P28 and/or a controller interface circuitry 410. The first to eighth pins P21 to P28 may respectively correspond to the first to eighth pins P11 to P18 of the memory device 300.

The controller interface circuitry 410 may transmit a chip enable signal nCE to the memory device 300 through the first pin P21. The controller interface circuitry 410 may transmit and receive signals to and from the memory device 300, which is selected by the chip enable signal nCE, through the second to eighth pins P22 to P28.

The controller interface circuitry 410 may transmit the command latch enable signal CLE, the address latch enable signal ALE, and the write enable signal nWE to the memory device 300 through the second to fourth pins P22 to P24. The controller interface circuitry 410 may transmit or receive the data signal DQ to and from the memory device 300 through the seventh pin P27.

The controller interface circuitry 410 may transmit the data signal DQ including the command CMD or the address ADDR to the memory device 300 along with the write enable signal nWE, which toggles. The controller interface circuitry 410 may transmit the data signal DQ including the command CMD to the memory device 300 by transmitting a command latch enable signal CLE having an enable state. Also, the controller interface circuitry 410 may transmit the data signal DQ including the address ADDR to the memory device 300 by transmitting an address latch enable signal ALE having an enable state.

The controller interface circuitry 410 may transmit the read enable signal nRE to the memory device 300 through the fifth pin P25. The controller interface circuitry 410 may receive or transmit the data strobe signal DQS from or to the memory device 300 through the sixth pin P26.

In a data (DATA) output operation of the memory device 300, the controller interface circuitry 410 may generate a read enable signal nRE, which toggles, and transmit the read enable signal nRE to the memory device 300. For example, before outputting data DATA, the controller interface circuitry 410 may generate a read enable signal nRE, which is changed from a static state (e.g., a high level or a low level) to a toggling state. Thus, the memory device 300 may generate a data strobe signal DQS, which toggles, based on the read enable signal nRE. The controller interface circuitry 410 may receive the data signal DQ including the data DATA along with the data strobe signal DQS, which toggles, from the memory device 300. The controller interface circuitry 410 may obtain the data DATA from the data signal DQ based on a toggle time point of the data strobe signal DQS.

In a data (DATA) input operation of the memory device 300, the controller interface circuitry 410 may generate a data strobe signal DQS, which toggles. For example, before transmitting data DATA, the controller interface circuitry 410 may generate a data strobe signal DQS, which is changed from a static state (e.g., a high level or a low level) to a toggling state. The controller interface circuitry 410 may transmit the data signal DQ including the data DATA to the memory device 300 based on toggle time points of the data strobe signal DQS.

The controller interface circuitry 410 may receive a ready/busy output signal nR/B from the memory device 300 through the eighth pin P28. The controller interface circuitry 410 may determine state information of the memory device 300 based on the ready/busy output signal nR/B.

Figure 17:
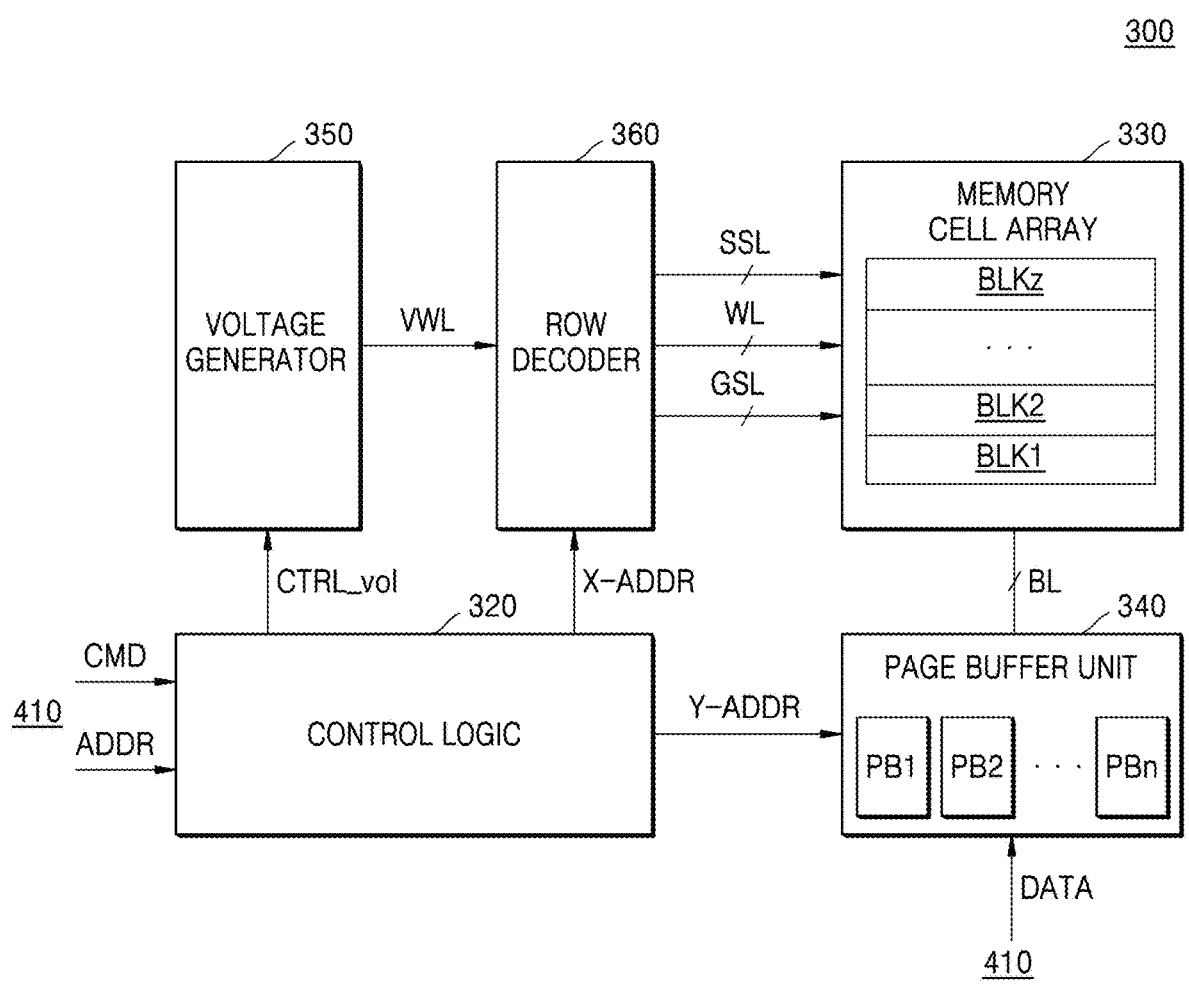
FIG. 17 is a block diagram illustrating an implementation example of a memory device of FIG. 16.

FIG. 17 is a block diagram of a memory device 300 of FIG. 16 according to example embodiments. Referring to FIG. 17, the memory device 300 may include a control logic circuitry 320, a memory cell array 330, a page buffer 340, a voltage generator 350, and/or a row decoder 360. Although not shown in FIG. 17, the memory device 300 may further include a memory interface circuitry 310 shown in FIG. 17. In addition, the memory device 300 may further include a column logic, a pre-decoder, a temperature sensor, a command decoder, and/or an address decoder.

The control logic circuitry 320 may control various operations (e.g., all operations) of the memory device 300. The control logic circuitry 320 may output various control signals in response to commands CMD and/or addresses ADDR from the memory interface circuitry 310. For example, the control logic circuitry 320 may output a voltage control signal CTRL_vol, a row address X-ADDR, and/or a column address Y-ADDR.

The memory cell array 330 may include a plurality of memory blocks BLK1 to BLKz (here, z is a positive integer), each, or one or more of which may include a plurality of memory cells. The memory cell array 330 may be connected to the page buffer 340 through bit lines BL and be connected to the row decoder 360 through word lines WL, string selection lines SSL, and ground selection lines GSL.

In example embodiments, the memory cell array 330 may include a 3D memory cell array, which includes a plurality of NAND strings. Each, or one or more, of the NAND strings may include memory cells respectively connected to word lines vertically stacked on a substrate. The disclosures of U.S. Pat. Nos. 7,679,133; 8,553,466; 8,654,587; 8,559,235; and US Pat. Pub. No. 2011/0233648 are hereby incorporated by reference. In example embodiments, the memory cell array 330 may include a 2D memory cell array, which includes a plurality of NAND strings arranged in a row direction and a column direction.

The page buffer 340 may include a plurality of page buffers PB1 to PBn (here, n is an integer greater than or equal to 3), which may be respectively connected to the memory cells through a plurality of bit lines BL. The page buffer 340 may select at least one of the bit lines BL in response to the column address Y-ADDR. The page buffer 340 may operate as a write driver or a sense amplifier according to an operation mode. For example, during a program operation, the page buffer 340 may apply a bit line voltage corresponding to data to be programmed, to the selected bit line. During a read operation, the page buffer 340 may sense current or a voltage of the selected bit line BL and sense data stored in the memory cell.

The voltage generator 350 may generate various kinds of voltages for program, read, and erase operations based on the voltage control signal CTRL_vol. For example, the voltage generator 350 may generate a program voltage, a read voltage, a program verification voltage, and/or an erase voltage as a word line voltage VWL.

The row decoder 360 may select one of a plurality of word lines WL and select one of a plurality of string selection lines SSL in response to the row address X-ADDR. For example, the row decoder 360 may apply the program voltage and/or the program verification voltage to the selected word line WL during a program operation and apply the read voltage to the selected word line WL during a read operation.

Figure 18:
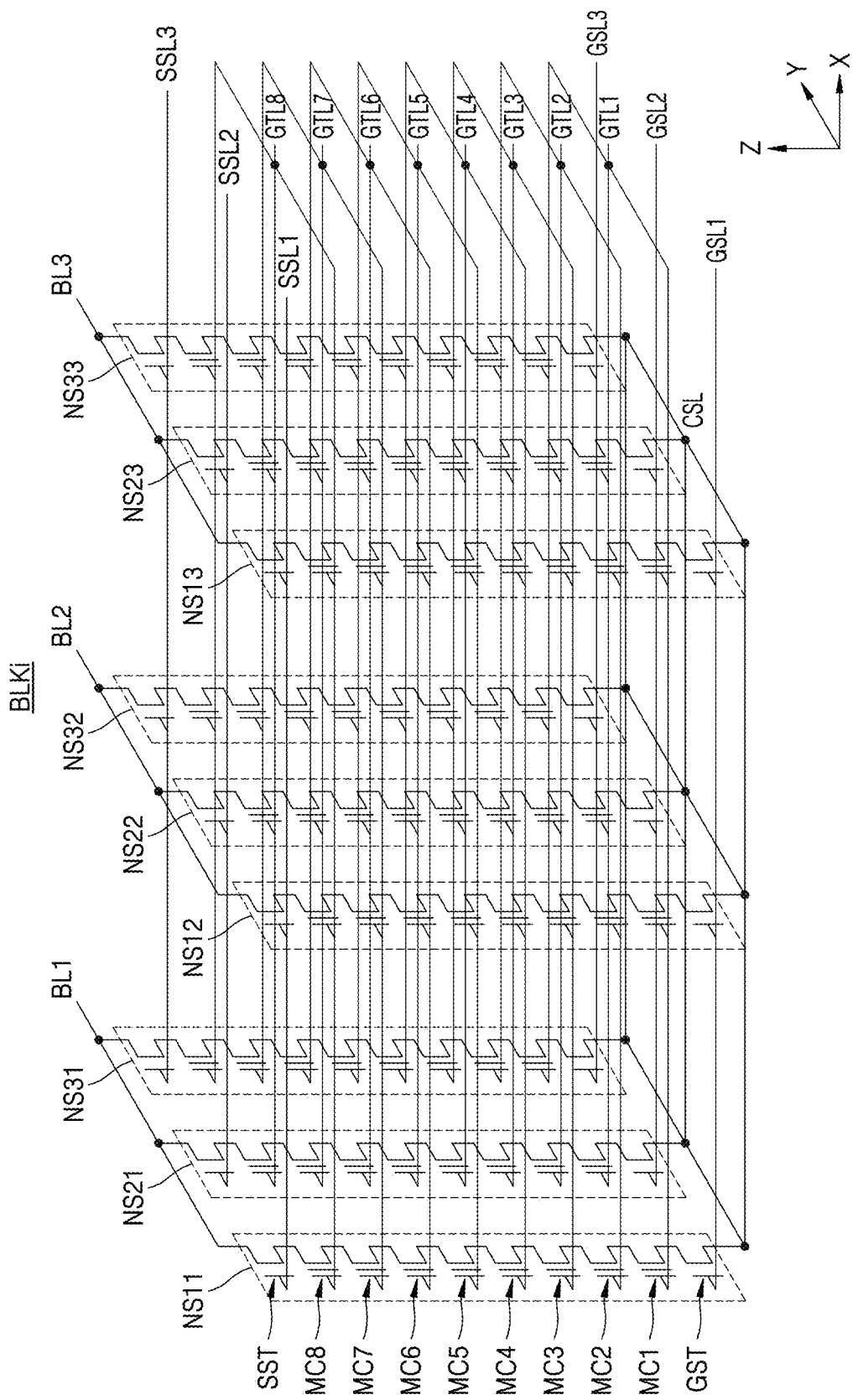
FIG. 18 is a diagram for explaining a three-dimensional (3D) V-NAND structure applicable to a UFS device according to example embodiments of the inventive concepts.

FIG. 18 is a diagram of a 3D V-NAND structure applicable to a UFS device according to embodiments. When a storage module of the UFS device is implemented as a 3D V-NAND flash memory, each, or one or more, of a plurality of memory blocks included in the storage module may be represented by an equivalent circuit shown in FIG. 18.

A memory block BLKi shown in FIG. 18 may refer to a 3D memory block having a 3D structure formed on a substrate. For example, a plurality of memory NAND strings included in the memory block BLKi may be formed in a vertical direction to the substrate.

Referring to FIG. 18, the memory block BLKi may include a plurality of memory NAND strings (e.g., NS11 to NS33), which are connected between bit lines BL1, BL2, and BL3 and a common source line CSL. Each, or one or more, of the memory NAND strings NS11 to NS33 may include a string selection transistor SST, a plurality of memory cells (e.g., MC1, MC2, . . . , and MC8), and a ground selection transistor GST. Each, or one or more, of the memory NAND strings NS11 to NS33 is illustrated as including eight memory cells MC1, MC2, . . . , and MC8 in FIG. 18, without being limited thereto.

The string selection transistor SST may be connected to string selection lines SSL1, SSL2, and/or SSL3 corresponding thereto. Each, or at least one of, the memory cells MC1, MC2, . . . , and MC8 may be connected to a corresponding one of gate lines GTL1, GTL2, . . . , and GTL8. The gate lines GTL1, GTL2, . . . , and GTL8 may respectively correspond to word lines, and some of the gate lines GTL1, GTL2, . . . , and GTL8 may correspond to dummy word lines. The ground selection transistor GST may be connected to ground selection lines GSL1, GSL2, and/or GSL3 corresponding thereto. The string selection transistor SST may be connected to the bit lines BL1, BL2, and/or BL3 corresponding thereto, and the ground selection transistor GST may be connected to the common source line CSL.

Word lines (e.g., WL1) at the same level may be connected in common, and the ground selection lines GSL1, GSL2, and/or GSL3 and the string selection lines SSL1, SSL2, and/or SSL3 may be separated from each other. FIG. 18 illustrates example embodiments in which a memory block BLK is connected to eight gate lines GTL1, GTL2, . . . , and GTL8 and three bit lines BL1, BL2, and BL3, without being limited thereto.

Figure 19:
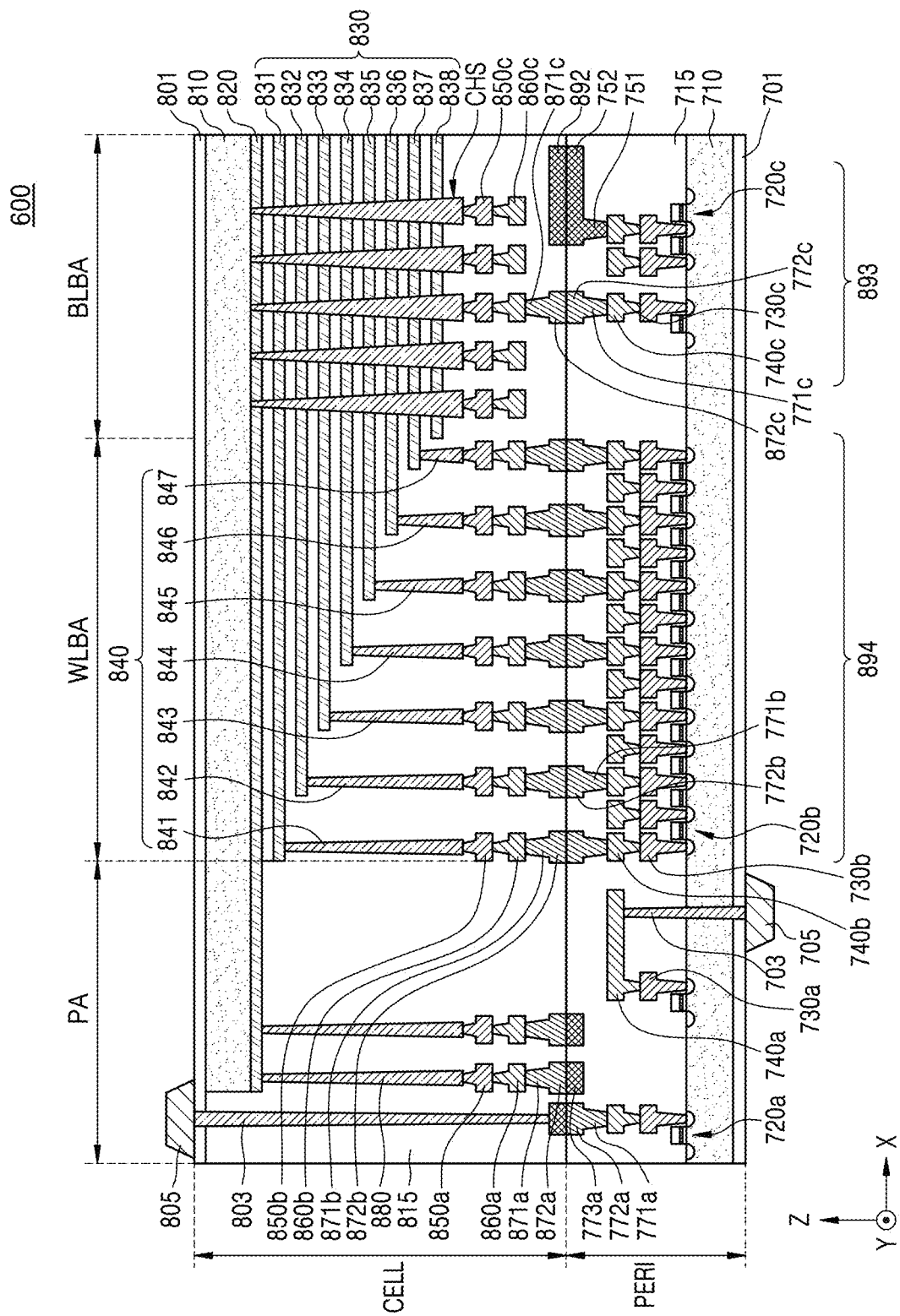
FIG. 19 is a diagram for explaining a bonding V-NAND (BVNAND) structure applicable to a UFS device according to example embodiments of the inventive concepts.

FIG. 19 is a diagram illustrating a memory device 600 according to other example embodiments.

Referring to FIG. 19, a memory device 600 may have a chip-to-chip (C2C) structure. The C2C structure may refer to a structure formed by manufacturing an upper chip including a cell region CELL on a first wafer, manufacturing a lower chip including a peripheral circuit region PERI on a second wafer, separate from the first wafer, and then bonding the upper chip and the lower chip to each other. Here, the bonding process may include a method of electrically connecting a bonding metal formed on an uppermost metal layer of the upper chip and a bonding metal formed on an uppermost metal layer of the lower chip. For example, when the bonding metals may include copper (Cu) using a Cu-to-Cu bonding. Example embodiments, however, may not be limited thereto. For example, the bonding metals may also be formed of aluminum (Al) or tungsten (W).

Each, or at least one of, the peripheral circuit region PERI and the cell region CELL of the memory device 600 may include an external pad bonding area PA, a word line bonding area WLBA, and/or a bit line bonding area BLBA.

The peripheral circuit region PERI may include a first substrate 710, an interlayer insulating layer 715, a plurality of circuit elements 720a, 720b, and/or 720c formed on the first substrate 710, first metal layers 730a, 730b, and/or 730c respectively connected to the plurality of circuit elements 720a, 720b, and/or 720c, and second metal layers 740a, 740b, and/or 740c formed on the first metal layers 730a, 730b, and/or 730c. In example embodiments, the first metal layers 730a, 730b, and/or 730c may be formed of tungsten having relatively high electrical resistivity, and the second metal layers 740a, 740b, and/or 740c may be formed of copper having relatively low electrical resistivity.

In example embodiments illustrated in FIG. 19, although only the first metal layers 730a, 730b, and 730c and the second metal layers 740a, 740b, and 740c are shown and described, example embodiments are not limited thereto, and one or more additional metal layers may be further formed on the second metal layers 740a, 740b, and/or 740c. At least a portion of the one or more additional metal layers formed on the second metal layers 740a, 740b, and 740c may be formed of aluminum or the like having a lower electrical resistivity than those of copper forming the second metal layers 740a, 740b, and 740c.

The interlayer insulating layer 715 may be disposed on the first substrate 710 and cover the plurality of circuit elements 720a, 720b, and/or 720c, the first metal layers 730a, 730b, and/or 730c, and/or the second metal layers 740a, 740b, and 740c. The interlayer insulating layer 715 may include an insulating material such as silicon oxide, silicon nitride, or the like.

Lower bonding metals 771b and/or 772b may be formed on the second metal layer 740b in the word line bonding area WLBA. In the word line bonding area WLBA, the lower bonding metals 771b and/or 772b in the peripheral circuit region PERI may be electrically bonded to upper bonding metals 871b and/or 872b of the cell region CELL. The lower bonding metals 771b and/or 772b and/or the upper bonding metals 871b and/or 872b may be formed of aluminum, copper, tungsten, or the like. Further, the upper bonding metals 871b and/or 872b in the cell region CELL may be referred as first metal pads and the lower bonding metals 771*b* and/or 772*b* in the peripheral circuit region PERI may be referred as second metal pads.

The cell region CELL may include at least one memory block. The cell region CELL may include a second substrate 810 and/or a common source line 820. On the second substrate 810, a plurality of word lines 831 to 838 (e.g., 830) may be stacked in a direction (e.g., a Z-axis direction), perpendicular to an upper surface of the second substrate 810. At least one string select line and at least one ground select line may be arranged on and below the plurality of word lines 830, respectively, and the plurality of word lines 830 may be disposed between the at least one string select line and the at least one ground select line.

In the bit line bonding area BLBA, a channel structure CH may extend in a direction (e.g., a Z-axis direction), perpendicular to the upper surface of the second substrate 810, and pass through the plurality of word lines 830, the at least one string select line, and the at least one ground select line. The channel structure CH may include a data storage layer, a channel layer, a buried insulating layer, and the like, and the channel layer may be electrically connected to a first metal layer 850*c* and/or a second metal layer 860*c*. For example, the first metal layer 850*c* may be a bit line contact, and/or the second metal layer 860*c* may be a bit line. In example embodiments, the bit line 860*c* may extend in a first direction (e.g., a Y-axis direction), parallel to the upper surface of the second substrate 810.

In example embodiments illustrated in FIG. 19, an area in which the channel structure CH, the bit line 860*c*, and the like are disposed may be defined as the bit line bonding area BLBA. In the bit line bonding area BLBA, the bit line 860*c* may be electrically connected to the circuit elements 720*c* providing a page buffer 893 in the peripheral circuit region PERI. The bit line 860*c* may be connected to upper bonding metals 871*c* and/or 872*c* in the cell region CELL, and the upper bonding metals 871*c* and/or 872*c* may be connected to lower bonding metals 771*c* and/or 772*c* connected to the circuit elements 720*c* of the page buffer 893. In example embodiments, a program operation may be executed based on a page unit as write data of the page-unit is stored in the page buffer 893, and a read operation may be executed based on a sub-page unit as read data of the sub-page unit is stored in the page buffer 893. Also, in the program operation and the read operation, units of data transmitted through bit lines may be different from each other.

In the word line bonding area WLBA, the plurality of word lines 830 may extend in a second direction (an X-axis direction), parallel to the upper surface of the second substrate 810 and perpendicular to the first direction, and may be connected to a plurality of cell contact plugs 841 to 847 (e.g., 840). The plurality of word lines 830 and the plurality of cell contact plugs 840 may be connected to each other in pads provided by at least a portion of the plurality of word lines 830 extending in different lengths in the second direction. A first metal layer 850*b* and/or a second metal layer 860*b* may be connected to an upper portion of the plurality of cell contact plugs 840 connected to the plurality of word lines 830, sequentially. The plurality of cell contact plugs 840 may be connected to the peripheral circuit region PERI by the upper bonding metals 871*b* and/or 872*b* of the cell region CELL and the lower bonding metals 771*b* and/or 772*b* of the peripheral circuit region PERI in the word line bonding area WLBA.

The plurality of cell contact plugs 840 may be electrically connected to the circuit elements 720*b* forming a row decoder 894 in the peripheral circuit region PERI. In example embodiments, operating voltages of the circuit elements 720*b* of the row decoder 894 may be different than operating voltages of the circuit elements 720*c* forming the page buffer 893. For example, operating voltages of the circuit elements 720*c* forming the page buffer 893 may be greater than operating voltages of the circuit elements 720*b* forming the row decoder 894.

A common source line contact plug 880 may be disposed in the external pad bonding area PA. The common source line contact plug 880 may be formed of a conductive material such as a metal, a metal compound, polysilicon, or the like, and may be electrically connected to the common source line 820. A first metal layer 850*a* and a second metal layer 860*a* may be stacked on an upper portion of the common source line contact plug 880, sequentially. For example, an area in which the common source line contact plug 880, the first metal layer 850*a*, and/or the second metal layer 860*a* are disposed may be defined as the external pad bonding area PA.

Input-output pads 705 and 805 may be disposed in the external pad bonding area PA. Referring to FIG. 19, a lower insulating film 701 covering a lower surface of the first substrate 710 may be formed below the first substrate 710, and a first input-output pad 705 may be formed on the lower insulating film 701. The first input-output pad 705 may be connected to at least one of the plurality of circuit elements 720*a*, 720*b*, and 720*c* disposed in the peripheral circuit region PERI through a first input-output contact plug 703, and may be separated from the first substrate 710 by the lower insulating film 701. In addition, a side insulating film may be disposed between the first input-output contact plug 703 and the first substrate 710 to electrically separate the first input-output contact plug 703 and the first substrate 710.

Referring to FIG. 19, an upper insulating film 801 covering the upper surface of the second substrate 810 may be formed on the second substrate 810, and a second input-output pad 805 may be disposed on the upper insulating layer 801. The second input-output pad 805 may be connected to at least one of the plurality of circuit elements 720*a*, 720*b*, and 720*c* disposed in the peripheral circuit region PERI through a second input-output contact plug 803. In example embodiments, the second input-output pad 805 is electrically connected to a circuit element 720*a*.

According to example embodiments, the second substrate 810 and the common source line 820 may not be disposed in an area in which the second input-output contact plug 803 is disposed. Also, the second input-output pad 805 may not overlap the word lines 830 in the third direction (e.g., the Z-axis direction). Referring to FIG. 19, the second input-output contact plug 303 may be separated from the second substrate 810 in a direction, parallel to the upper surface of the second substrate 810, and may pass through the interlayer insulating layer 815 of the cell region CELL to be connected to the second input-output pad 805.

According to example embodiments, the first input-output pad 705 and/or the second input-output pad 805 may be selectively formed. For example, the memory device 600 may include only the first input-output pad 705 disposed on the first substrate 710 or the second input-output pad 805 disposed on the second substrate 810. Alternatively, the memory device 600 may include both the first input-output pad 705 and the second input-output pad 805.

A metal pattern provided on an uppermost metal layer may be provided as a dummy pattern or the uppermost metal layer may be absent, in each, or one or more, of the external pad bonding area PA and the bit line bonding area BLBA, respectively included in the cell region CELL and the peripheral circuit region PERI.

In the external pad bonding area PA, the memory device 600 may include a lower metal pattern 773a, corresponding to an upper metal pattern 872a formed in an uppermost metal layer of the cell region CELL, and having the same cross-sectional shape as the upper metal pattern 872a of the cell region CELL so as to be connected to each other, in an uppermost metal layer of the peripheral circuit region PERI. In the peripheral circuit region PERI, the lower metal pattern 773a formed in the uppermost metal layer of the peripheral circuit region PERI may not be connected to a contact. Similarly, in the external pad bonding area PA, an upper metal pattern 872a, corresponding to the lower metal pattern 773a formed in an uppermost metal layer of the peripheral circuit region PERI, and having the same shape as a lower metal pattern 773a of the peripheral circuit region PERI, may be formed in an uppermost metal layer of the cell region CELL.

The lower bonding metals 771b and/or 772b may be formed on the second metal layer 740b in the word line bonding area WLBA. In the word line bonding area WLBA, the lower bonding metals 771b and/or 772b of the peripheral circuit region PERI may be electrically connected to the upper bonding metals 871b and/or 872b of the cell region CELL by a Cu-to-Cu bonding.

Further, in the bit line bonding area BLBA, an upper metal pattern 892, corresponding to a lower metal pattern 752 formed in the uppermost metal layer of the peripheral circuit region PERI, and having the same cross-sectional shape as the lower metal pattern 752 of the peripheral circuit region PERI, may be formed in an uppermost metal layer of the cell region CELL. A contact may not be formed on the upper metal pattern 892 formed in the uppermost metal layer of the cell region CELL.

In example embodiments, corresponding to a metal pattern formed in an uppermost metal layer in one of the cell region CELL and the peripheral circuit region PERI, a reinforcement metal pattern having the same cross-sectional shape as the metal pattern may be formed in an uppermost metal layer in the other one of the cell region CELL and the peripheral circuit region PERI. A contact may not be formed on the reinforcement metal pattern.

One or more of the elements disclosed above may include or be implemented in one or more processing circuitries such as hardware including logic circuits; a hardware/software combination such as a processor executing software; or a combination thereof. For example, the processing circuitries more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While the inventive concepts have been particularly shown and described with reference to example embodiments thereof, it will be understood that various changes in form and details may be made therein without departing from the spirit and scope of the following claims.

What is claimed is:

1. An electronic device comprising a host device connected to a storage device, wherein the host device comprises:
    processing circuitry configured to
       process a submission queue (SQ) and a completion queue (CQ), wherein the SQ is a processing standby line of a command, and the CQ is a processing standby line of a response received from the storage device;
       transmit the command to the storage device;
       store a host command credit in a host command register, the host command credit indicating an estimated command accommodation limit of the storage device;
       store the response in a response slot; and
       store a host response credit in a host response register, the host response credit indicating a limit of the response slot.

2. The electronic device of claim 1, wherein the processing circuitry is further configured to
    check an empty space of a command slot included in the storage device based on the host command credit, and
    transmit the command and the host response credit to the storage device.

3. The electronic device of claim 1, wherein the storage device comprises:
    a storage response register configured to store a storage response credit indicating an estimated response accommodation limit of the host device;
    a command slot configured to store the command;
    a storage command register configured to store a storage command credit indicating a limit of the command slot; and
    a storage controller configured to transmit the response to the host device.

4. The electronic device of claim 3, wherein the storage controller is further configured to
    insert the command into the command slot, and
    update the storage response credit based on the host response credit.

5. The electronic device of claim 3, wherein the storage controller is further configured to
    check an empty space of the response slot based on the storage response credit, and
    transmit the response and the storage command credit to the host device.

6. The electronic device of claim 5, wherein the processing circuitry is further configured to
    insert the response into the response slot, and
    update the host command credit based on the storage command credit.

7. The electronic device of claim 1, wherein
    a first head pointer and a first tail pointer are referenced in the SQ,
    a second head pointer and a second tail pointer are referenced in the CQ, and
    the processing circuitry is further configured to store the first head pointer, the second head pointer, the first tail pointer, and the second tail pointer.

8. The electronic device of claim 7, wherein the processing circuitry is further configured to
    update the first tail pointer in accordance with storing the command in the SQ, and
    update the first head pointer in accordance with transmitting the command to the storage device.

9. The electronic device of claim 8, wherein the processing circuitry is further configured to
    update the second tail pointer in accordance with storing the response in the CQ, and
    update the second head pointer in accordance with performing the response.

10. The electronic device of claim 1, wherein
the processing circuitry comprises a first core and a second core,
the first core is configured to process a first SQ and a first CQ, and
the second core is configured to process a second SQ and a second CQ.

11. The electronic device of claim 10, wherein the processing circuitry is further configured to transmit, to the storage device, the command, the host response credit, an SQ ID indicating an SQ fetched by the processing circuitry, and a CQ ID indicating a CQ fetched by the processing circuitry.

12. The electronic device of claim 10, wherein the processing circuitry is further configured to
select one of the first SQ and the second SQ, and
fetch a command stored in the selected SQ.

13. The electronic device of claim 10, wherein the processing circuitry is further configured to
route a response stored in the response slot to a CQ selected from the first CQ and the second CQ.

14. The electronic device of claim 1, wherein at least one of the SQ or the CQ is implemented as circular queue.

15. An operating method of a host device, the operating method comprising:
writing a command to at least one submission queue (SQ);
transmitting, to a storage device, the command and a host response credit, the host response credit indicating an actual response accommodation limit of the host device, the response accommodation limit of the host device based on a host command credit, the host command credit indicating an estimated command accommodation limit of the storage device;
receiving a response and a storage command credit from the storage device, the response being a result of performing the command, and the storage command credit indicating an actual command accommodation limit of the storage device;
updating the host command credit based on the storage command credit; and
writing the response to at least one completion queue (CQ).

16. The operating method of claim 15, wherein
the writing the command comprises updating a tail pointer of the at least one SQ, and
the transmitting the command and the host response credit to the storage device comprises updating a head pointer of the at least one SQ.

17. The operating method of claim 15, further comprising:
updating a head pointer of the at least one CQ as the written response is performed,
wherein the writing the response comprises updating a tail pointer of the at least one CQ.

18. The operating method of claim 15, wherein
the at least one SQ comprises a first SQ to be processed by a first core of the host device and a second SQ to be processed by a second core of the host device,
the at least one CQ comprises a first CQ to be processed by the first core and a second CQ to be processed by the second core, and
the transmitting the command and the host response credit to the storage device comprises further transmitting an SQ ID indicating a fetched SQ.

19. The operating method of claim 18, further comprising:
selecting one of the first SQ or the second SQ, and
fetching a command stored in the selected SQ.

20. The operating method of claim 18, further comprising:
routing a response stored in a response slot included in the host device to a selected CQ from the first CQ and the second CQ.

* * * * *